(12) United States Patent
Satpathy et al.

(10) Patent No.: US 12,355,756 B2
(45) Date of Patent: Jul. 8, 2025

(54) COMPUTING DEVICE COMPONENT MONITORING SYSTEM

(71) Applicant: Dell Products L.P., Round Rock, TX (US)

(72) Inventors: Pallavi Satpathy, Bhubaneswar (IN); Harmeet Singh, Bengaluru (IN); Rama Rao Bisa, Bangalore (IN); Pravin Velumani, Auroville (IN)

(73) Assignee: Dell Products L.P., Round Rock, TX (US)

( * ) Notice: Subject to any disclaimer, the term of this patent is extended or adjusted under 35 U.S.C. 154(b) by 494 days.

(21) Appl. No.: 17/721,800

(22) Filed: Apr. 15, 2022

(65) Prior Publication Data
US 2023/0336537 A1 Oct. 19, 2023

(51) Int. Cl.
*H04L 9/40* (2022.01)
(52) U.S. Cl.
CPC .......... *H04L 63/0823* (2013.01); *H04L 63/20* (2013.01)
(58) Field of Classification Search
CPC ............................ H04L 63/0823; H04L 63/20
See application file for complete search history.

(56) References Cited

U.S. PATENT DOCUMENTS

| | | | | |
|---|---|---|---|---|
| 2004/0088141 | A1* | 5/2004 | Ashley | H04L 41/0253 702/184 |
| 2004/0195307 | A1* | 10/2004 | De Mol Van Otterloo | G03G 21/1889 235/375 |
| 2005/0163514 | A1* | 7/2005 | Hwang | G03G 15/5079 399/12 |
| 2008/0118253 | A1* | 5/2008 | Abe | G03G 15/0865 399/12 |
| 2017/0208059 | A1* | 7/2017 | Shin | H04W 12/069 |
| 2020/0264967 | A1* | 8/2020 | Kwon | G06F 11/364 |
| 2020/0278873 | A1* | 9/2020 | Hsu | G06F 11/0751 |
| 2020/0356672 | A1* | 11/2020 | Paulraj | H04L 63/0823 |
| 2021/0055896 | A1* | 2/2021 | Portnoy | G03G 15/553 |
| 2021/0096506 | A1* | 4/2021 | Hong | H04N 1/00204 |

(Continued)

OTHER PUBLICATIONS

Andre Postma et al., "Component Replacement in a Long-Living Architecture: The 3RDBA Approach," Jun. 2004, pp. 1-10 (Year: 2004).*

(Continued)

*Primary Examiner* — Luu T Pham
*Assistant Examiner* — Canh Le
(74) *Attorney, Agent, or Firm* — Joseph Mencher

(57) ABSTRACT

A computing device component monitoring system includes at least one certificate generation system, and a computing device that includes a first component and that is coupled to the at least one certificate generation system via a network. The computing device receives a first component verification certificate from the at least one certificate generation system that identifies a first component lifetime after which the first component in the computing device should be replaced, and stores the first component verification certificate in a database that is accessible to the computing device. The computing device determines that the first component lifetime has been exceeded, and identifies a first component alert policy in response. The computing device generates a first component alert based on the first component alert policy.

17 Claims, 15 Drawing Sheets

(56) References Cited

U.S. PATENT DOCUMENTS

2021/0116851 A1* 4/2021 Kasuga .............. G03G 15/5062
2022/0237281 A1* 7/2022 Best ................... G06F 12/1458

OTHER PUBLICATIONS

Sergio Rota et al., "Run-time Monitoring for Dependable Systems: an Approach and a Case Study,", Oct. 2004, pp. 1-8. (Year: 2004).*

* cited by examiner

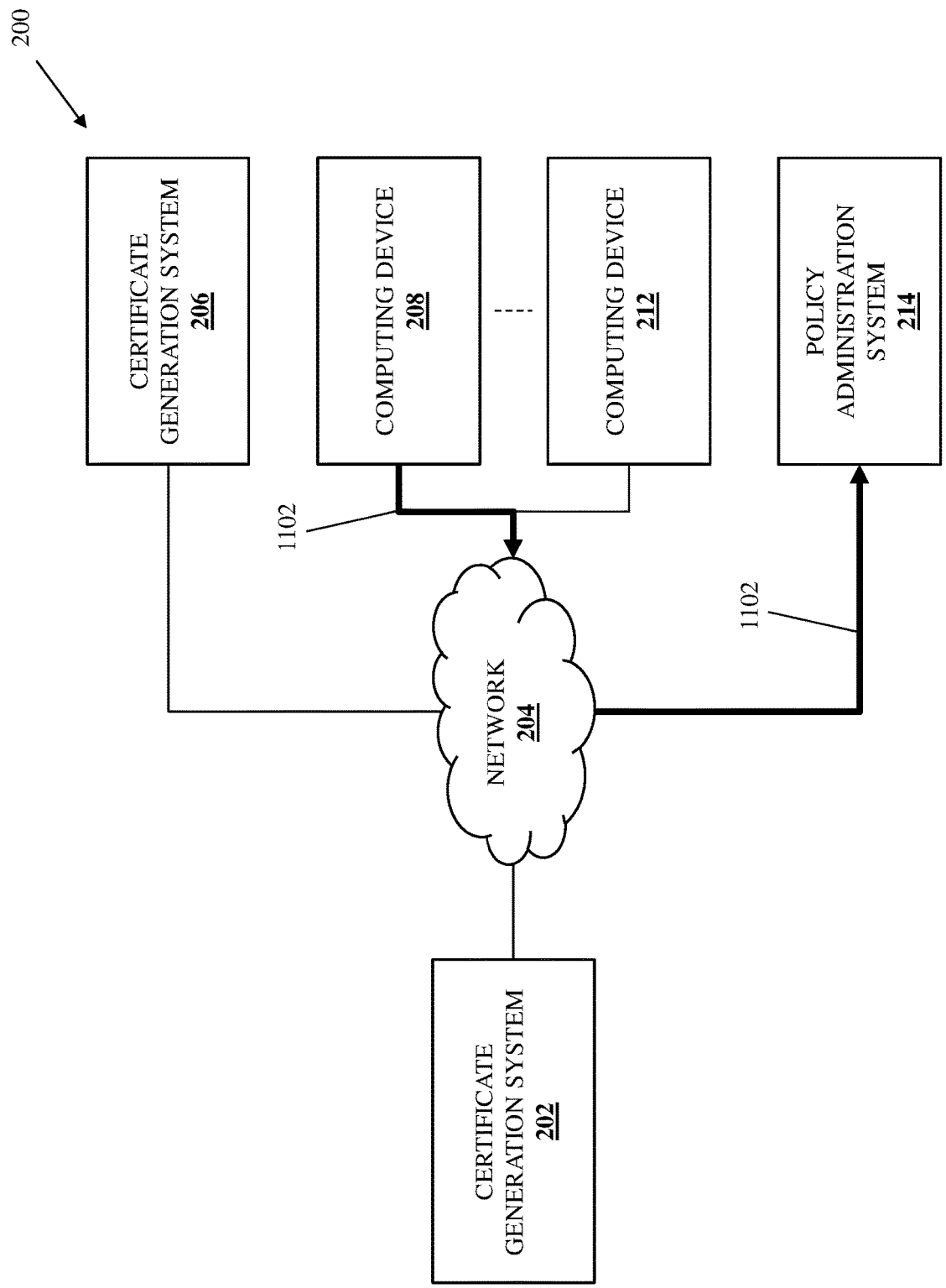

COMPUTING DEVICE COMPONENT MONITORING SYSTEM

BACKGROUND

The present disclosure relates generally to information handling systems, and more particularly to systems for monitoring components in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Modern organizations operate in and rely upon a complex information technology (IT) environment consisting of numerous hardware, network and/or software systems, including computers, servers, routers, applications, microservices, mobile technologies, and other information handling systems known in the art. The effective management of the IT environment is critical to allow such organizations to properly function and realize their broader strategic goals. Organizations will typically develop and implement IT policies for managing computing systems and their constituent devices. By way of example, an organization may seek to ensure that systems are always available and are operating reliably, and may employ policies regarding the appropriate lifetime of systems and their components to that end. For instance, an organization may have a policy of replacing components or taking other action once they have been in use for a particular period. For example, an organization may have a policy of replacing power supply units (PSU) after being in use for two years or once the manufacturer warranty has expired, or backing up information on a storage device six months prior to warranty expiration or after a specified number of read and/or write operations have been performed.

Traditionally, system administrators are responsible for enforcing such IT policies. However, adhering to such policies has proved to be challenging given the sheer number of computing systems and component devices at issue, and often results in the disparate treatment of component devices. For example, for each system in the IT environment, the system administrator must identify what component devices are present, determine the recommended lifetime for each component device, check to see how long the component device has been in use, determine whether the component device has exceeded the recommended lifetime, and ultimately take action (e.g., purchasing a replacement component device or initiating a back-up process). The fact that computing systems receive upgrades and undergo maintenance in an ad-hoc manner only serves to complicate matters further, as the component devices in use and their usage state are in a constant state of flux throughout the lifetime of a computing system.

Accordingly, it would be desirable to provide a computing device component monitoring system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a component monitoring engine that is configured to: receive, from at least one certificate generation system, a first IHS component verification certificate that identifies a first component lifetime after which a first component in the IHS should be replaced; store, in a database that is accessible to the processing system, the first IHS component verification certificate; determine that the first component lifetime has been exceeded; identify, in response to determining that the first component lifetime has been exceeded, a first component alert policy; and generate, based on the first component alert policy, a first component alert.

BRIEF DESCRIPTION OF THE DRAWINGS

FIG. 11 is a schematic view illustrating an embodiment of the networked system of FIG. 2 operating during the method of FIG. 5.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
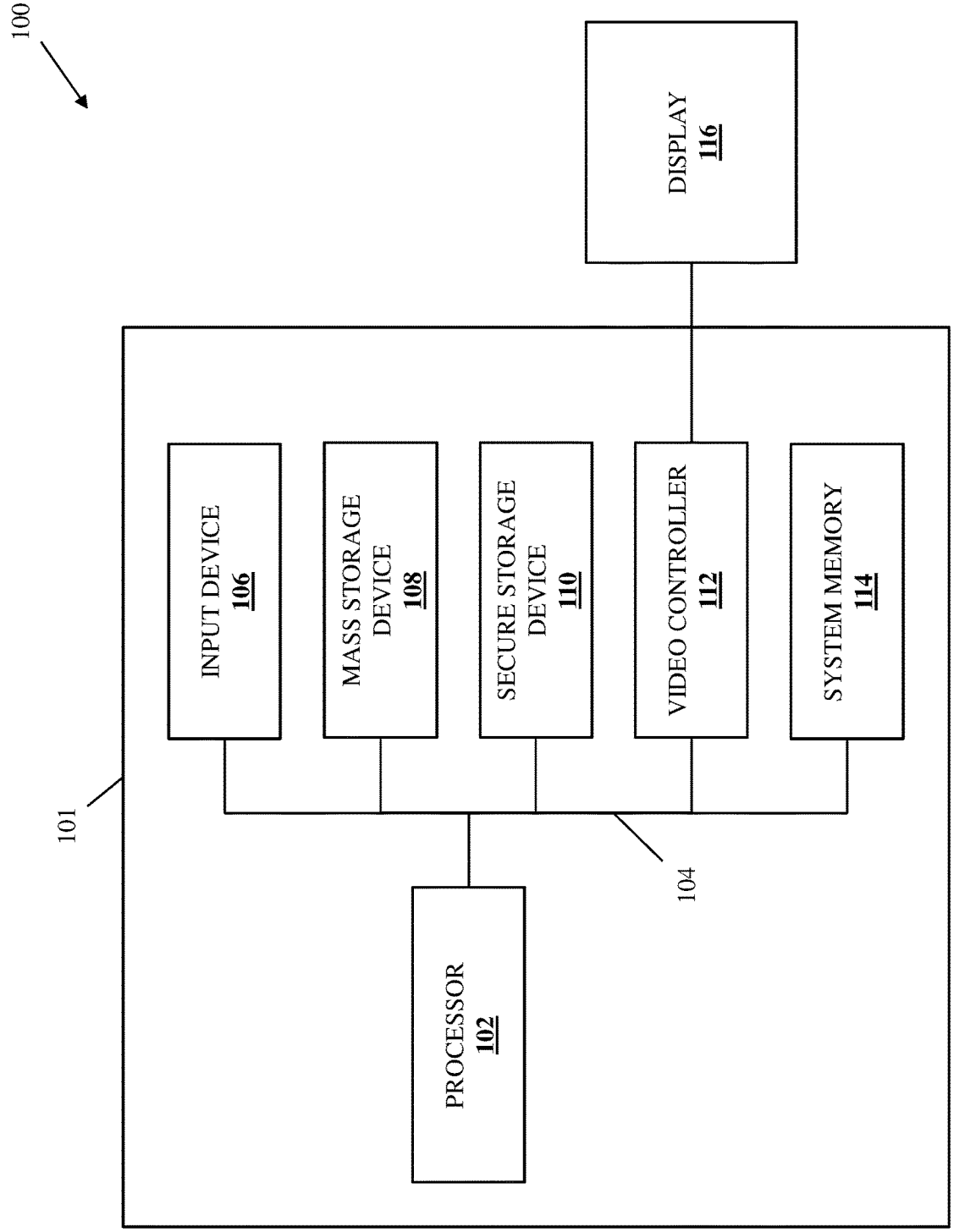
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. The IHS 100 may also include a secure storage device 110 to securely store information (e.g., passwords, certificates, encryption keys, or other artifacts) and system integrity measurements for authentication and attestation of the IHS 100 and its components. The secure storage device 110 may be provided as part of a trusted platform module (TPM) designed to provide hardware-based, security-related functions. The TPM may include a secure-crypto processor designed to carry out cryptographic operations and may include one or more physical security mechanisms to make it tamper-resistant. It should be understood that other buses and intermediate circuits can be deployed between the components described above and processor 102 to facilitate interconnection between the components and the processor 102.

Figure 2:
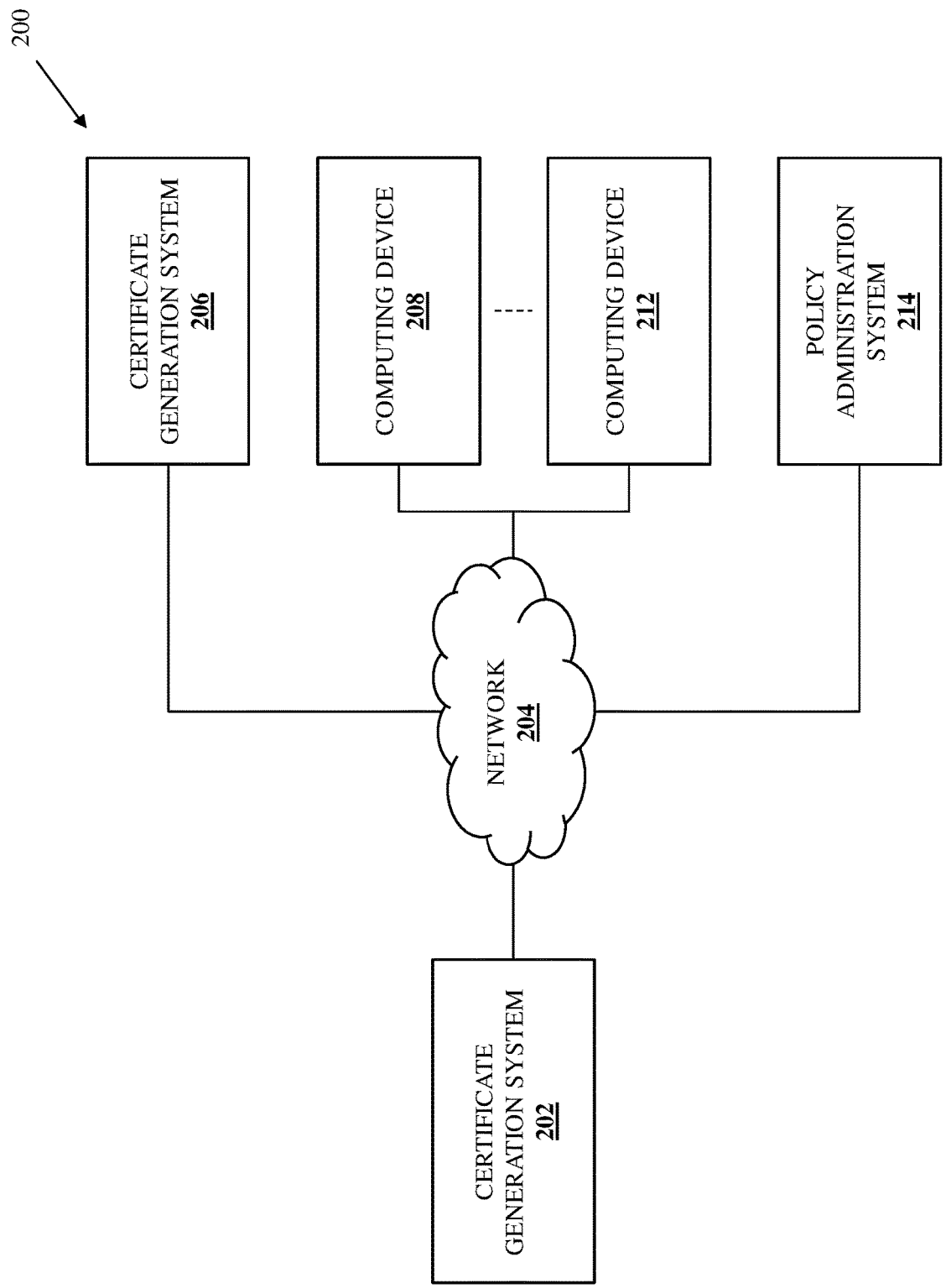
FIG. 2 is a schematic view illustrating an embodiment of a networked system that may provide the component monitoring system of the present disclosure.

Referring now to FIG. 2, an embodiment of a networked system 200 is illustrated that may utilize the component monitoring system of the present disclosure. In the illustrated embodiment, the networked system 200 includes a certificate generation system 202. In an embodiment, the certificate generation system 202 may be provided by the IHS 100 discussed above with reference to FIG. 1, and/or may include some or all of the components of the IHS 100. In specific examples, the certificate generation system 202 may be provide by one or more server devices. However, while illustrated and discussed as being provided by one or more server devices, one of skill in the art in possession of the present disclosure will recognize that the certification generation system 202 provided in the networked system 200 may include any devices that may be configured to operate similarly as the certification generation system 202 discussed below.

In the illustrated embodiment, the certification generation system 202 is coupled to a network 204 that may be provided by a Local Area Network (LAN), the Internet, combinations thereof, and/or any of a variety of other networks that would be apparent to one of skill in the art in possession of the present disclosure. In some embodiments, the networked system 200 may include additional certificate generation systems, such as the certificate generation system 206 that is coupled to the network 204 in FIG. 2. In an embodiment, the certificate generation system 206 may be provided by the IHS 100 discussed above with reference to FIG. 1, and/or may include some or all of the components of the IHS 100. In specific examples, the certificate generation system 206 may be provide by one or more server devices. However, while illustrated and discussed as being provided by one or more server devices, one of skill in the art in possession of the present disclosure will recognize that the certification generation system 206 provided in the networked system 200 may include any devices that may be configured to operate similarly as the certification generation system 202 discussed below.

As illustrated, a plurality of computing devices 208 up to 212 are coupled to the network 206 as well. In an embodiment, any or all of the computing devices 208-212 may be provided by the IHS 100 discussed above with reference to FIG. 1, and/or may include some or all of the components of the IHS 100. In specific examples, the computing devices 208-212 may be provided by server devices, networking devices (e.g., switch devices), storage systems, desktop computing devices, laptop/notebook computing devices, tablet computing device, mobile phones, and/or other computing devices known in the art. However, while illustrated and described as being provided by particular computing devices, one of skill in the art in possession of the present disclosure will appreciate that the computing devices 208-212 may be provided by a variety of other computing devices that may be configured to operate similarly as the computing devices 208-212 discussed below.

In the illustrated embodiment, a policy administration system 214 is also coupled to the network 204. The policy administration system 214 may be provided by the IHS 100 discussed above with reference to FIG. 1, and/or may include some or all of the components of the IHS 100. In specific examples, the policy administration system 214 may be provided by one or more server devices. However, while illustrated and discussed as being provided by one or more server devices, one of skill in the art in possession of the present disclosure will recognize that the policy administration system 214 provided in the networked system 200 may include any devices that may be configured to operate similarly as the policy administration system 214 discussed below.

However, while a specific networked system 200 has been illustrated and described, one of skill in the art in possession of the present disclosure will recognize that the computing device component monitoring system of the present disclosure may include a variety of components and component configurations while remaining within the scope of the present disclosure as well. For example, the network system 200 is illustrated and described as including discrete certificate generation systems 202 and 206 that may be located at physically separate locations. By way of example, the certificate generation system 202 may be located at a manufacturing facility where computing devices 208-212 are originally manufactured, while the certificate generation system 204 may be located within the Information Technology (IT) department of an organization at which the computing devices 208-212 are deployed. However, a person of ordinary skill in the art in possession of the present disclosure would recognize that alternative embodiments may include fewer or additional certificate generation systems and different locations than those described above. For example, the networked system may rely on a single certificate generation system provided at the computing device manufacturing facility, or may include additional certificate generation systems at computing device resellers that may modify/customize computing devices before delivering them to organizations for deployment. Furthermore, in some instances, the certification generation system may be closely integrated within the same environment as the computing devices themselves. In such cases, the certificate generation system and computing device may be provided by the same server or servers.

Figure 3:
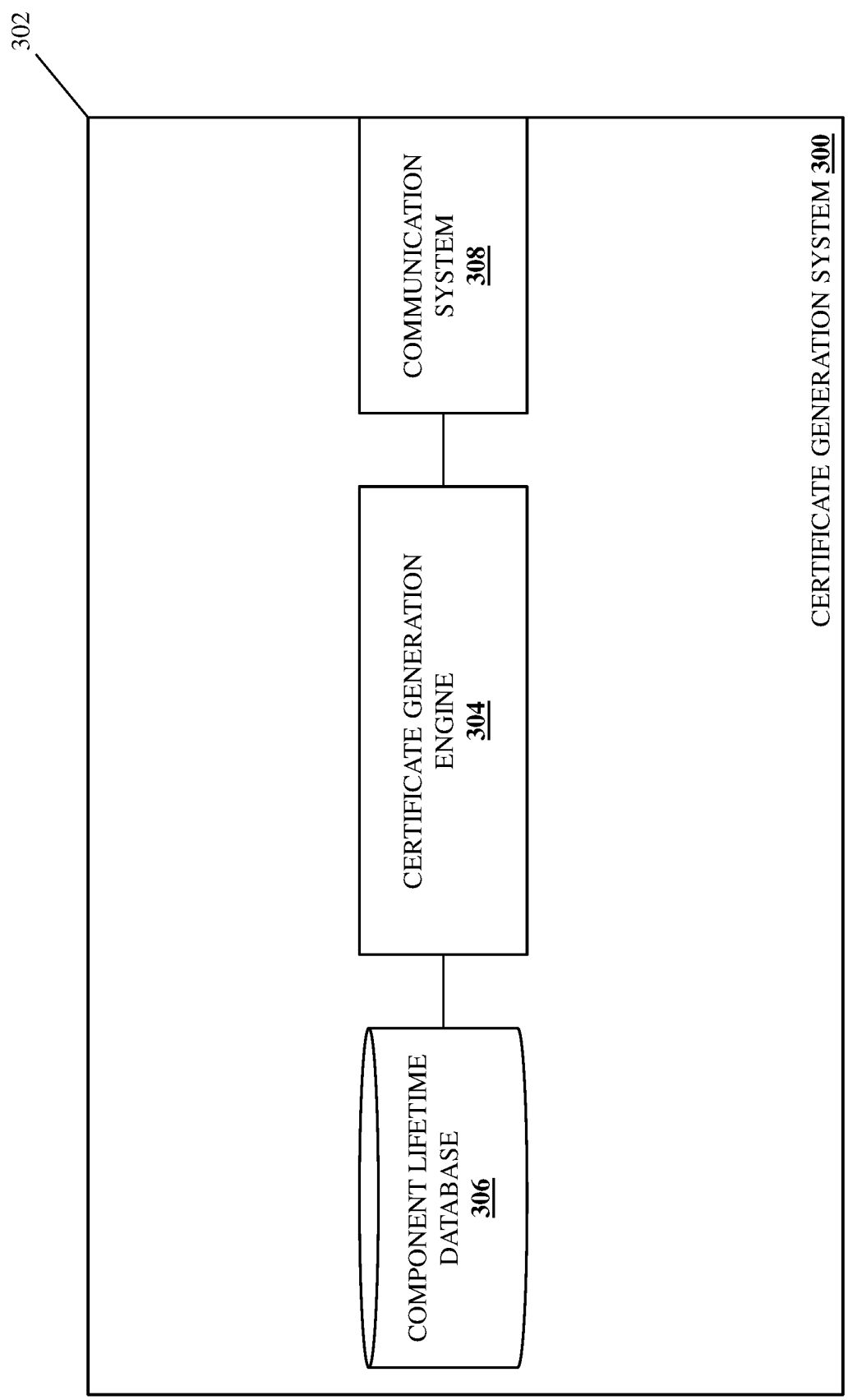
FIG. 3 is a schematic view illustrating an embodiment of a certificate generation system that may be included in the networked system of FIG. 2.

Referring now to FIG. 3, an embodiment of a certificate generation system 300 is illustrated that may provide either of the certificate generation systems 202 and 206 discussed above with reference to FIG. 2. As such, the certificate generation system 300 may be provided by the IHS 100 discussed above with reference to FIG. 1 and/or may include some or all of the components of the IHS 100, and in specific examples may be provided by one or more server devices. However, while illustrated and discussed as being provided by server device(s), one of skill in the art in possession of the present disclosure will recognize that the functionality of the certificate generation system 300 discussed below may be provided by other devices that are configured to operate similarly as the certificate generation system 300 discussed below. In the illustrated embodiment, certificate generation system 300 includes a chassis 302 that houses the components of the certificate generation system 300, only some of which are illustrated and discussed below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a certificate generation engine 304 that is configured to perform the functionality of the certificate generation engine and/or certificate generation systems discussed below. In some specific examples provided below, the certificate generation engine 304 may be provided by a Secure Component Verification (SCV) certificate generation application in SCV certificate generation systems provided by DELL® Inc. of Round Rock, Texas, United States.

The chassis 302 may also house a storage system (not illustrated, but which may include the storage 108 and/or secure storage 110 discussed above with reference to FIG. 1) that is coupled to the certificate generation engine 304 (e.g., via a coupling between the storage system and the processing system) and that includes a component lifetime database 306 that is configured to store any of the information utilized by the certificate generation engine 304 discussed below. The chassis 302 may also house a communication system 308 that is coupled to the certificate generation engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific certificate generation system 300 has been illustrated, one of skill in the art in possession of the present disclosure will recognize that certificate generation systems (or other devices operating according to the teachings of the present disclosure in a manner similar to that described below for the certificate generation system 300) may include a variety of components and/or component configurations for providing conventional server functionality, as well as the functionality discussed below, while remaining within the scope of the present disclosure as well.

Figure 4:
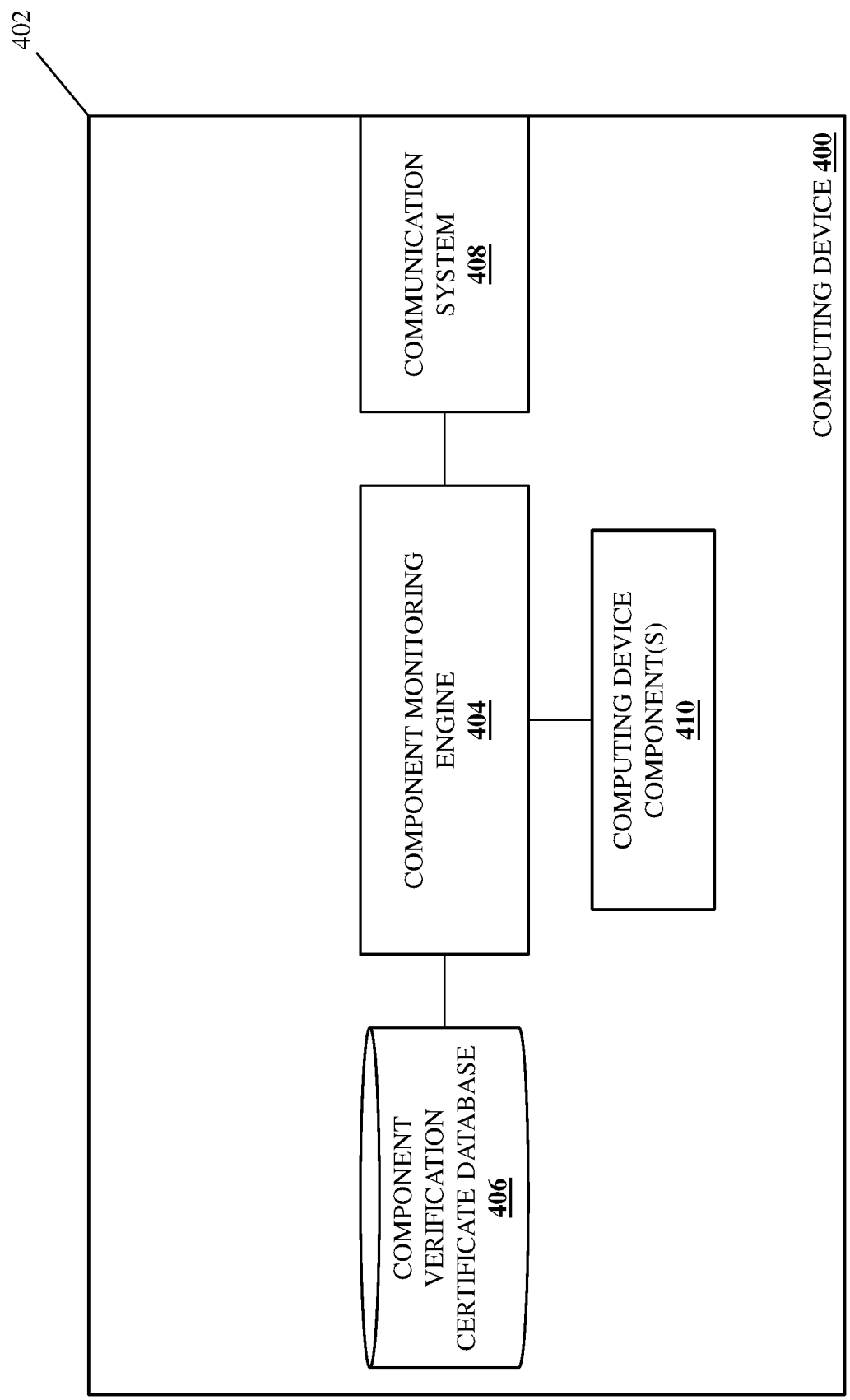
FIG. 4. is a schematic view illustrating an embodiment of a computing device that may be included in the networked system of FIG. 2.

Referring now to FIG. 4, an embodiment of a computing device 400 is illustrated that may provide any of the computing devices 208-212 discussed above with reference to FIG. 2. As such, the computing device 400 may be provided by the IHS 100 discussed above with reference to FIG. 1 and/or may include some or all of the components of the IHS 100, and in specific examples may be provided by server devices, networking devices (e.g., switch devices), storage systems, desktop computing devices, laptop/notebook computing devices, tablet computing device, mobile phones, and/or other computing devices known in the art. Furthermore, while illustrated and discussed as being provided by particular computing devices, one of skill in the art in possession of the present disclosure will recognize that the functionality of the computing device 400 discussed below may be provided by other devices that are configured to operate similarly as the computing device 400 discussed below. In the illustrated embodiment, the computing device 400 includes a chassis 402 that houses the computing device components 410 of the computing device 400, only some of which are illustrated and discussed below. For example, the chassis 402 may house a processing system (not specifically illustrated, but which may include the processor 102 discussed above with reference to FIG. 1) and a memory system (not specifically illustrated, but which may include the memory 114 discussed above with reference to FIG. 1) that is coupled to the processing system and that includes instructions that, when executed by the processing system, cause the processing system to provide a component monitoring engine 404 that is configured to perform the functionality of the component monitoring engines and/or computing devices discussed below. In some specific examples provided below, the component monitoring engine 404 may be provided by a Secure Component Verification (SCV) application available in computing device provided by DELL® Inc. of Round Rock, Texas, United States.

The chassis 402 may also house a storage system (not specifically illustrated, but which may include the storage 108 and/or secure storage 110 discussed above with reference to FIG. 1) that is coupled to the component monitoring engine 404 (e.g., via a coupling between the storage system and the processing system) and that includes a component verification certificate database 406 that is configured to store any of the information utilized by the component monitoring engine 404 discussed below. The chassis 402 may also house a communication system 408 that is coupled to the component monitoring engine 404 (e.g., via a coupling between the communication system 408 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific computing device 400 has been illustrated, one of skill in the art in possession of the present disclosure will recognize that computing devices (or other devices operating according to the teachings of the present disclosure in a manner similar to that described below for the computing device 400) may include a variety of components and/or component configurations for providing conventional computing device functionality, as well as the functionality discussed below, while remaining within the scope of the present disclosure as well.

As discussed below, the systems and methods of the present disclosure provide for monitoring of a computing device to determine when its constituent components have exceeded their respective component lifetimes. The computing device may generate an alert when the component lifetime of a component has been exceeded based on an identified component alert policy such that remedial action can be taken. In this way, an organization is able to efficiently and effectively manage its IT environment and the computing devices deployed therein. The systems and methods of the present disclosure provide for monitoring of computing devices across their lifetime, even as the configuration of the components within the computing devices change (e.g., as additional components are added or components are replaced), and as the policies of the organization evolve. Furthermore, as discussed below, the monitoring of the computing device and its components may be effectuated through the use of component verification certificates that are conventionally utilized to provide supply chain assurance, and that may be augmented to include component lifetime information for the components identified therein. Because computing devices may already be configured to receive and process component verification certificates (though solely for purposes of ensuring the computing device has not been altered in the supply chain), the need for significant changes to the computing device (e.g., additional software, network, and/or hardware components) in order to perform the component monitoring discussed below is obviated.

For example, the networked system of the present disclosure may include one or more certificate generation systems, one or more computing devices, and a policy administration system that are all coupled together via a network. The computing devices may receive component verification certificate(s) from the certificate generation system(s) that identify component lifetimes for one or more components in the respective computing devices, and store the component verification certificate(s) in a database. The component verification certificate(s) may then be used by the computing devices to determine whether their respective components have exceeded their component lifetimes. If a component lifetime has been exceeded for a particular component, the computing device may identify a corresponding component alert policy for the component and generate an alert based on the component alert policy.

Figure 5:
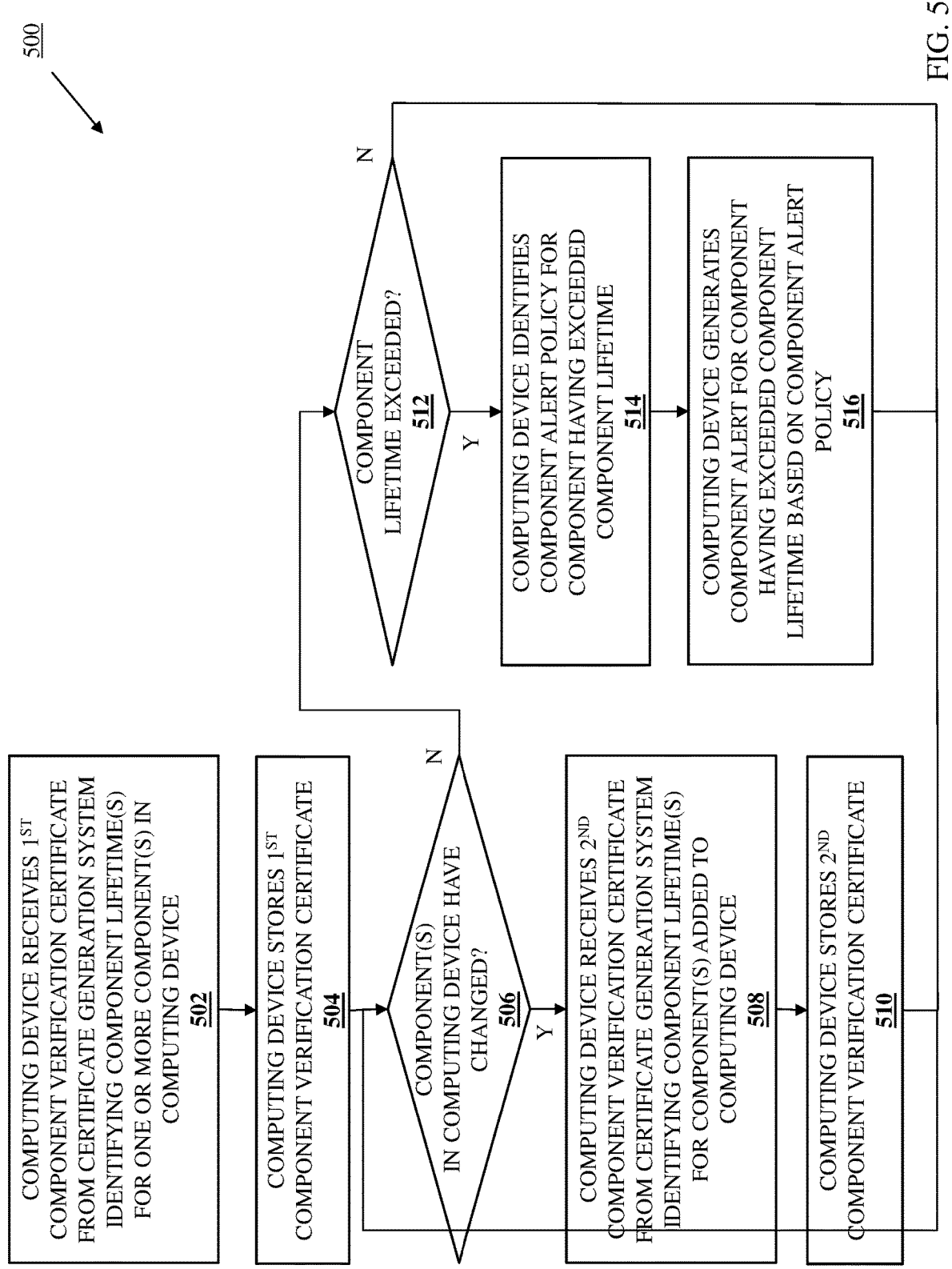
FIG. 5 is a flow chart illustrating an embodiment of a method for monitoring components in a computing device.

Referring now to FIG. 5, an embodiment of a method 500 for monitoring components of a computing device is illustrated. In the discussion below, specific reference is made toward monitoring power supply and mass storage device components of a computing device, but one of skill in the art in possession of the present disclosure will appreciate that any of a variety of different components may be present within a computing device as noted above and may be monitored similarly to the power supply and mass storage devices discussed below. One of skill in the art in possession of the present disclosure will also appreciate that the method 500 may be performed for any particular computing device component or combination of computing device components, and thus different performances of the method 500 may provide for monitoring of different computing devices.

The method 500 begins at block 502 where a computing device receives a first component verification certificate from a certificate generation system that identifies component lifetimes for one or more components of the computing device. For example, a certificate generation system may generate an initial component verification certificate when a computing device is first manufactured, and that initial component verification certificate may identify an initial inventory of components included in the computing device at the time of manufacture, along with respective component lifetimes for these components. The component verification certificate may then be uploaded to the computing device (e.g., stored in a database in the computing device), which may then be delivered to an organization or other user for deployment.

Figure 6A:
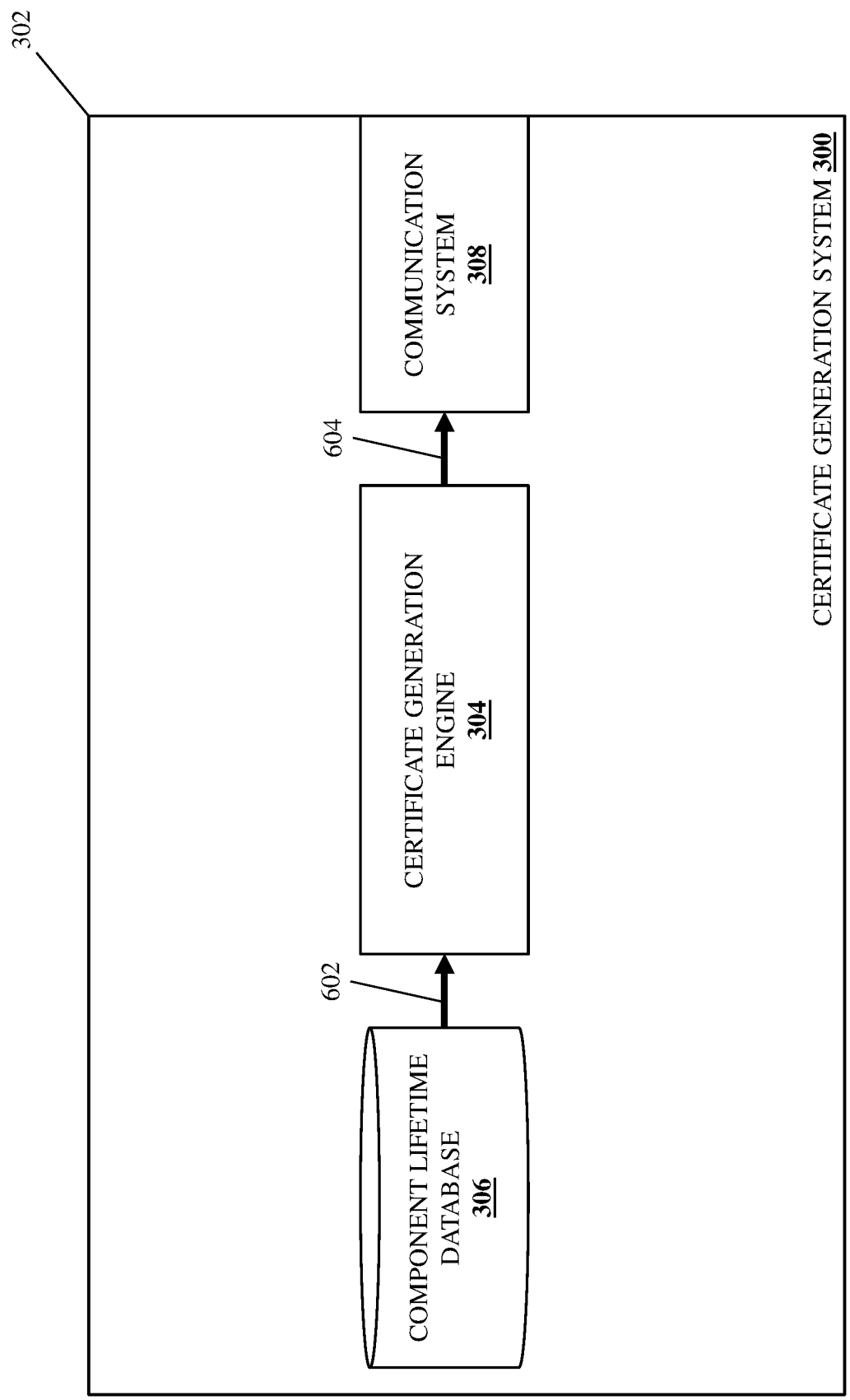
FIG. 6A is a schematic view illustrating an embodiment of the certificate generation system of FIG. 3 operating during the method of FIG. 5.
Figure 6B:
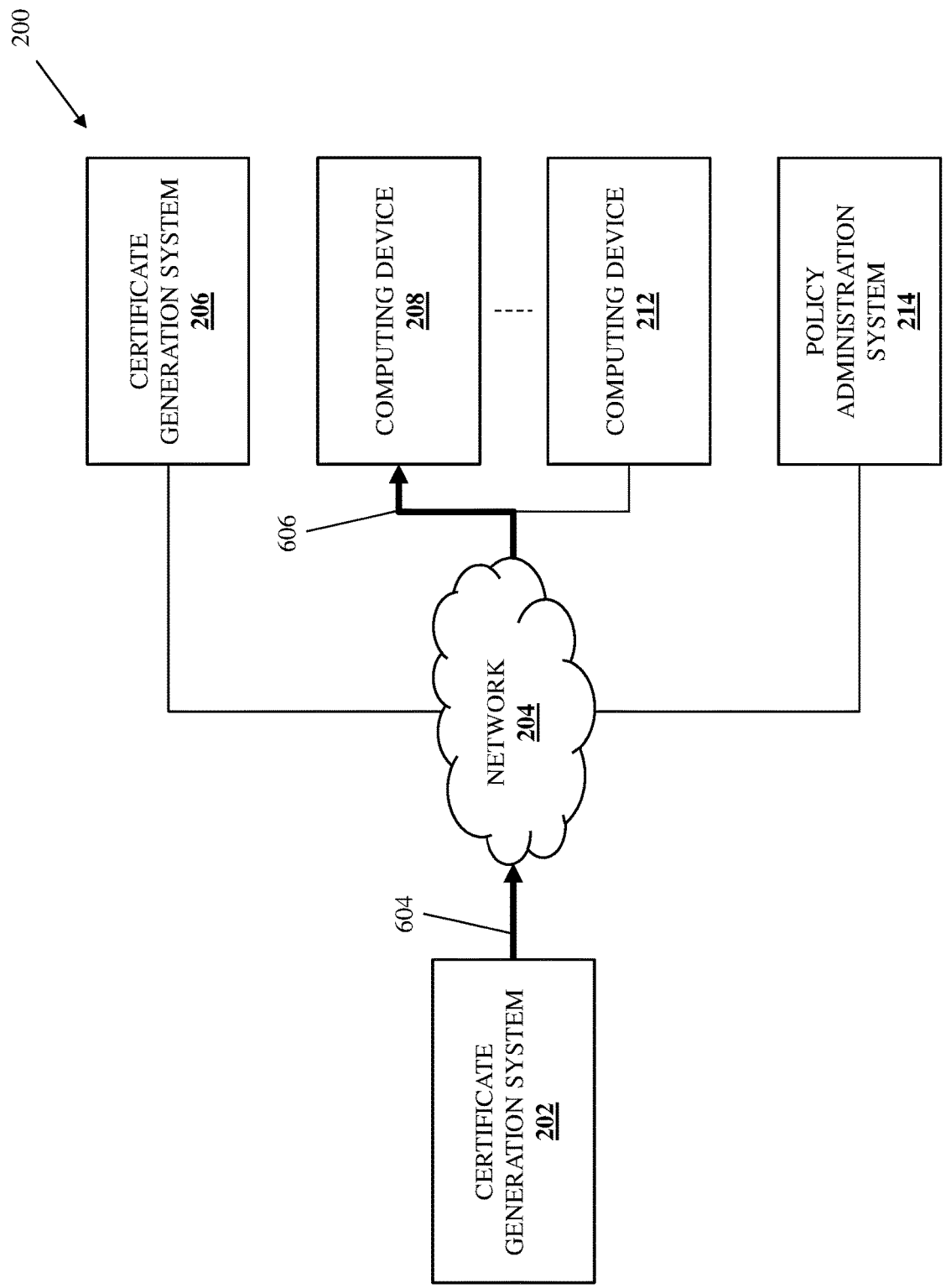
FIG. 6B is a schematic view illustrating an embodiment of the networked system of FIG. 2 operating during the method of FIG. 5.
Figure 6C:
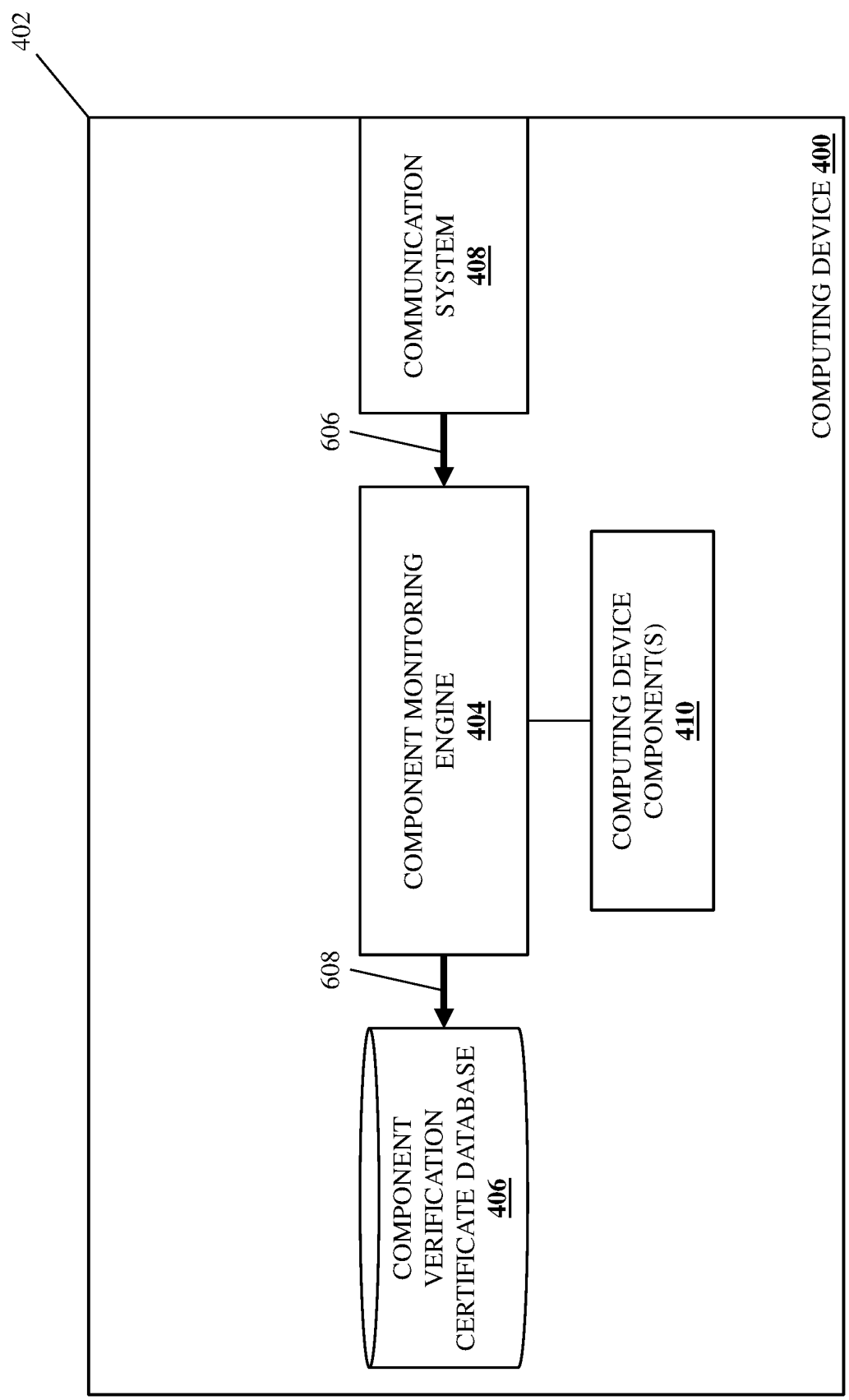
FIG. 6C is a schematic view illustrating an embodiment of the computing device of FIG. 4 operating during the method of FIG. 5.

In an embodiment, at block 502 and with reference to FIGS. 6A, 6B, and 6C, the certificate generation system 202/300 in the networked system 200 may operate to generate a component verification certificate for computing device 208/400 having various computing device components 410. For example, as discussed above, a component verification certificate may be generated upon initial manufacture of computing device 208/400. In doing so, the certificate generation engine 304 may perform computing device analysis operations to analyze computing device 208/400 and identify an inventory of computing device components 410 provided therein. The certificate generation engine 304 may then perform certificate generation operations to generate a component verification certificate that includes component identification information as well as component lifetimes for each of the identified computing device components.

In an embodiment, the component identification information provided in the component verification certificate may be used by computing device 208/400 to verify that it has not been modified since the component verification certificate was generated (e.g., since its initial manufacture). In a specific example, the component verification certificate may be a Secure Component Verification (SCV) certificate provided with computing devices manufactured by DELL® Inc. of Round Rock, Texas, United States, which one of skill in the art in possession of the present disclosure will recognize may be utilized, using SCV techniques, in order to provide assurances that the computing device and its components have not been altered in the supply chain between the computing device manufacturer and the organization/user. In an embodiment, the component identification information may include a unique component identifier along with details regarding the manufacturer, model, serial number, and/or version of the component, as well as any other SCV information that would be apparent to one of skill in the art in possession of the present disclosure. However, while a specific component verification certificate and component identification information has been described, one of skill in the art in possession of the present disclosure will appreciate that other component verification certificates and/or component identification information may be utilized while remaining within the scope of the present disclosure as well.

As discussed below, component lifetime information may be provided in the component verification certificate and used by computing device 208/400 to determine whether the computing device components 410 have exceeded a desired lifetime. Continuing with the specific example provided above, the SCV certificates provided with computing device manufactured by DELL® Inc. of Round Rock, Texas, United States, may be augmented with the component lifetime information in order to leverage existing SCV infrastructure (e.g., the SCV certificate generation systems and SCV applications discussed above) in order to perform the component monitoring operations discussed below without the need for separate/new component monitoring infrastructure. In an embodiment, the component lifetime information may identify that a particular computing device component 410 should only be used for a particular period of time, which as discussed below may include a default recommended lifetime of a component, an organizational IT policy associated with how long a component should be in use, and/or may be based on a variety of other component lifetime factors that would be apparent to one of skill in the art in possession of the present disclosure.

For example, component manufacturers may provide components with default recommended lifetimes after which they recommend those components be replaced, and those default recommended lifetimes may be available to the computing device manufacturer for use as the component lifetime information. However, organizations may include policies to replace components once a warranty has expired (e.g., a manufacturer warranty for the component, or an extended warranty purchased from the computing device manufacturer), or for more critical components, at some time prior to its expected failure (e.g., 6 months less than the mean time of failure (MTF) for the component), and may make associated component lifetimes available to the computing device manufacturer for use as the component lifetime information. As discussed in some of the specific examples below, component lifetimes may be expressed in terms of an amount of usage (e.g., 3000 program/erase cycles, or 2000 hours at peak voltage), as well as other component lifetime factors that would be apparent to one of skill in the art in possession of the present disclosure. As such, the component lifetimes specifically discussed herein are merely exemplary and that any suitable component lifetime measure may be utilized and provided in the component verification certificate.

In some embodiments, the component lifetimes included in the component verification certificate may be expressed in terms of one or more component lifetime parameters. By way of an example in which components are to be replaced upon expiration of a warranty, the component lifetime parameters may specify a duration and a date of purchase. In some embodiments, the component lifetime parameters may identify multiple component lifetimes. For example, the component verification certificate may provide a default component lifetime (e.g., the duration of the manufacturer warranty, or a mean time to failure of the component), as well as a recommended lifetime (e.g., specified by the IT department of an organization). One of skill in the art in possession of the present disclosure will appreciate that the component lifetime parameters specifically discussed are merely exemplary and that component lifetimes may be expressed in any number of different ways.

In generating the component verification certificate, the certificate generation engine 304 may perform component lifetime retrieval operations 602 to retrieve component lifetime parameters from component lifetime database 306 based on, for example, the component identification information for the components (e.g., the manufacturer and model). However, while illustrated as being retrieved from component lifetime database 306 in FIG. 6A, one of skill in the art in possession of the present disclosure will recognize that the parameters may be retrieved from any component in the computing device 300 that may store such information. In some embodiments, the certificate generation engine 304 may request and receive the component lifetime parameters from the policy administration system 214 or a component manufacturer system (not illustrated). For example, the certificate generation engine 304 may invoke an outward facing service (e.g., via the communication system 308 and through network 204) provided by the policy administration system 214 or a component manufacturer system (not illustrated) that returns this information.

As a specific example, an SCV component verification certificate for a computing device including a power supply unit may include the following identification information and component lifetime parameters for the power supply unit:

[PowerSupply1]
ComponentRegistry=OID: 2.23.133.18.3.1
ComponentClass=FORMAT: HEX,OCT: 000A0002
PowerSupply1=SEQUENCE: PowerSupply 1INV
[PowerSupply 1INV]
Manufacturer=UTF8: "DELL"
Model=UTF8: "PWR SPLY,1400W,RDNT,LTON"
Serial=IMP: 0,UTF8: "CNLOD0007E2ED5"
Version=IMP: 1,UTF8: "Unknown"
ComponentProperties=IMP: 9,SEQUENCE: PowerSupply1Policies
[PowerSupply 1Policies]
Location=IMP: 0,SEQUENCE: PowerSupply 1Lifetime
DefaultLifetime=IMP: 1,UTF8: "1yr"
DateOfPurchase=IMP: 2, UTF8: "Mar. 12, 2020" [PowerSupply
1 Lifetime]
Locationname=IMP: 0,UTF8: Recommended Lifetime
Locationvalue=IMP: 1,UTF8: "2yr"

In the specific example provided above, the Default Lifetime parameter of 1 year (i.e., DefaultLifetime=IMP: 1,UTF8: "1yr") may reflect the duration of a manufacturer warranty and may be retrieved from a component manufacturer system, and the Date Of Purchase parameter of Mar. 12, 2020 (e.g., DateOfPurchase=IMP: 2,UTF8: "Mar. 12, 2020") may be set to the current date on which the certificate is being generated. The recommended lifetime parameter of 2 years (i.e., Locationname=IMP: 0,UTF8: Recommended Lifetime; Locationvalue=IMP: 1,UTF8: "2yr") may reflect a more relaxed policy of the organization and may be retrieved from the component lifetime database 306 or policy administration system 204. However, while a specific SCV component verification certificate is described above, one of skill in the art in possession of the present disclosure will appreciate how component verification certificates may provide component lifetime information in a variety of manners that will fall within the scope of the present disclosure as well.

Once the component verification certificate has been generated, the certificate generation engine 304 may perform certificate transmission operations 604 to transmit the component verification certificate via the communication system 308, over the network 204, and to computing device 208/400 (as illustrated in FIGS. 6A and 6B). The component monitoring engine 404 of the computing device 208/400 may, in turn, perform certificate receipt operations 606 to receive the component verification certificate over the network 204 via its communication system 408 (as illustrated in 6C). As will be appreciated by one of skill in the art in possession of the present disclosure, the transmission and receipt of the component verification certificate between the certificate generation system 202 and computing device 208/400 may take place automatically. For example, upon generation of the component verification certificate, the certificate generation system 202 may automatically invoke an outward facing service that is provided by the computing device 208/400 and that is configured to receive the component verification certificate. One of skill in the art in possession of the present disclosure will recognize that the exchange of the component verification certificate between the certificate generation system 202 and computing device 208/400 may involve additional steps beyond those discussed such as, for example, requiring system authentication and/or performance of other security measures. One of skill in the art in possession of the present disclosure will also recognize that any of a number of other techniques for exchanging the component verification certificate between the certificate generation system 202 and computing device 208/400 may be suitably employed.

The method 500 then proceeds to block 504 where the computing device stores the component verification certificate. In an embodiment, at block 504 and with reference to FIG. 6C, the component monitoring engine 404 of the computing device 208/400 performs certificate storage operations 608 to store the component verification certificate in the component verification certificate database 406. As noted above, the component verification certificate database 406 may reside in a secure storage device such that the component verification certificate database 406 is tamper-resistant. In such cases, the certificate storage operations 608 may involve one or more cryptographic operations. Furthermore, while illustrated as being stored in component verification certificate database 406 in FIG. 6C, one of skill in the art in possession of the present disclosure will recognize that the component verification certificate may be stored in any component in the computing device 400 capable of storing such information in a form suitable for that component.

The method 500 may then proceed to decision block 506 where a determination is made whether the computing device component(s) in the computing device have changed, for example, if a component has been added, replaced, and/or removed. In an embodiment, the computing device 208/400 may be delivered to a reseller after its initial manufacture, which may modify/customize the components of computing device 208/400 before delivering it to the organization for deployment. As another example, the computing device 208/400 may be upgraded or undergo maintenance once placed into operation within the IT environment of the organization, which may result in changes to its computing device components 410.

Figure 7:
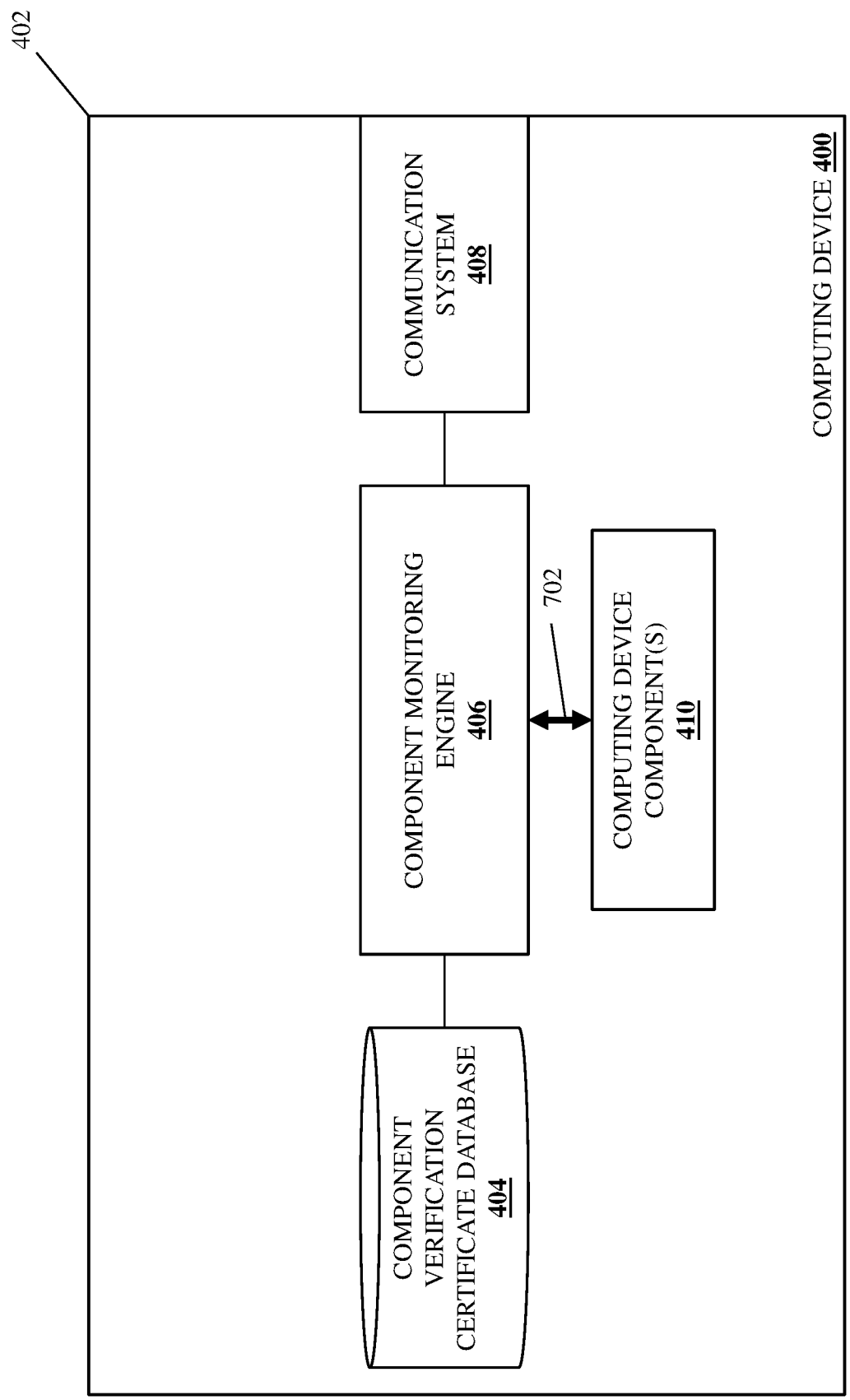
FIG. 7 is a schematic view illustrating an embodiment of the computing device of FIG. 4 operating during the method of FIG. 5.

In an embodiment, at decision block 506 and with reference to FIG. 7, the component monitoring engine 404 of computing device 208/400 may perform component monitoring operations 702 to detect changes in the computing device components 410 of computing device 208/400. In some embodiments, the detection of changes in the computing device components 410 may be manually initiated. For example, a device reseller may initiate component monitoring operations 702 to capture any modifications/customizations that were made to computing device 208/400, or an IT administrator may initiate component monitoring operations 702 after the computing device 208/300 has been upgraded or undergone maintenance. In other embodiments, the component monitoring engine 404 may automatically check for changes in computing device components 410. For example, the component monitoring engine 404 may look for changes periodically (e.g., hourly, daily, weekly, or some other set interval) and/or in conjunction with other operations of the computing device 208/400 (e.g., upon startup of the computing device 208/400). In yet other embodiments, the component monitoring engine 404 may operate to continuously monitor the computing device 208/400 for changes in its computing device components 410.

If, at decision block 506, it is determined that the components of the computing device have changed, the method 500 proceeds to block 508 where the computing device receives an additional component verification certificate from a certificate generation system that identifies component lifetimes for the newly added components. For example, a reseller may customize a computing device and may use a certificate generation system of the reseller to generate an additional component verification certificate to capture these changes. As another example, an organization may upgrade or perform maintenance on a computing device that is already deployed in its IT environment, and may use a certificate generation system of the organization to generate an additional component verification certificate to capture these changes. The component verification certificate that is generated may include an inventory of only the newly added components (i.e., a "delta" component verification certificate), or a complete inventory of computing device components along with component lifetimes for those components. Alternatively, the certificate generation system may modify an existing component verification certificate (e.g., an initial component verification certificate generated by a computing device manufacturer) to include the newly added components and corresponding component lifetimes. As will be appreciated by one of skill in the art in possession of the present disclosure, once generated by a component generation system, the component verification certificate may be transmitted to and received by the computing device.

Figure 8A:
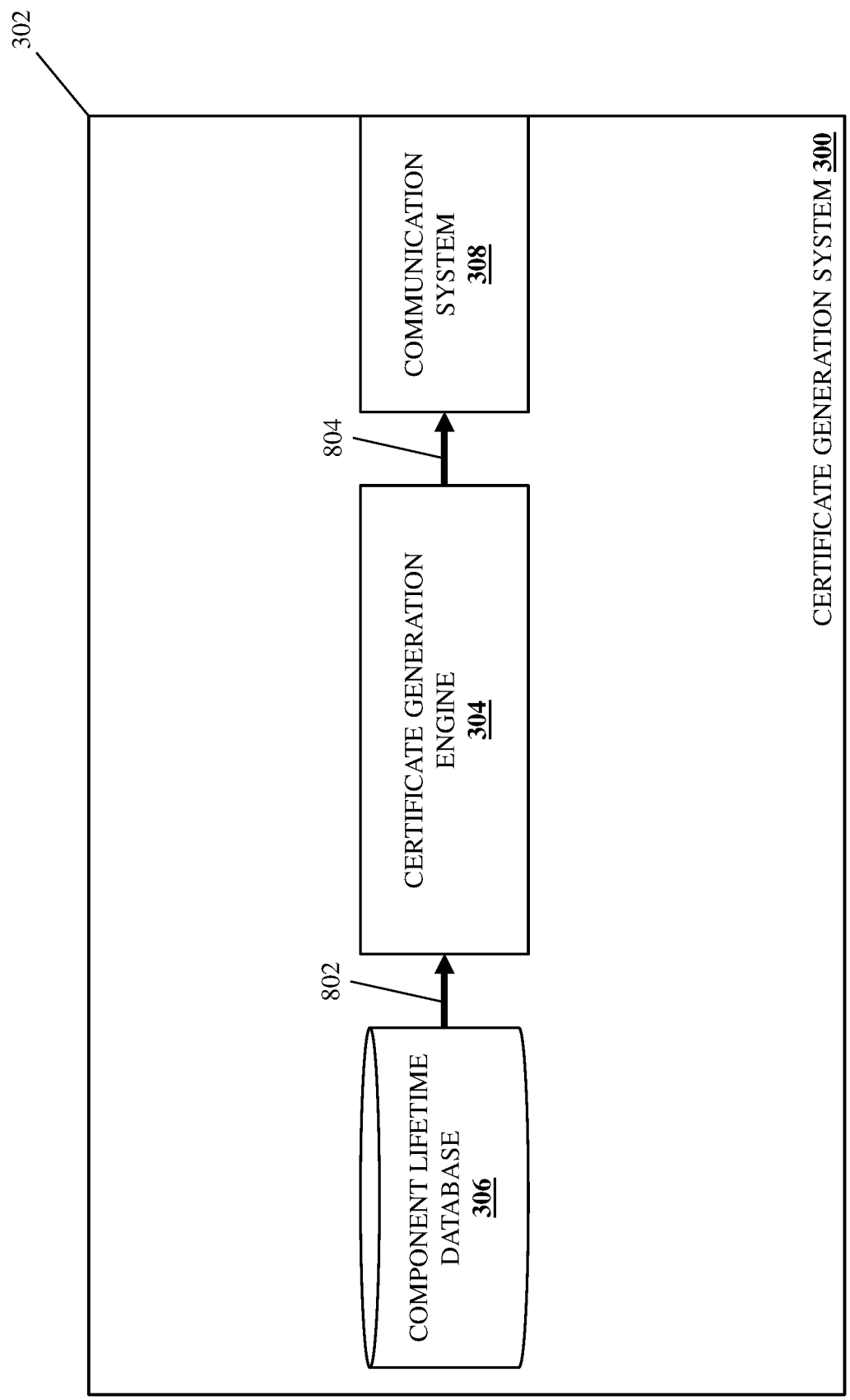
FIG. 8A is a schematic view illustrating an embodiment of the certificate generation system of FIG. 3 operating during the method of FIG. 5.
Figure 8B:
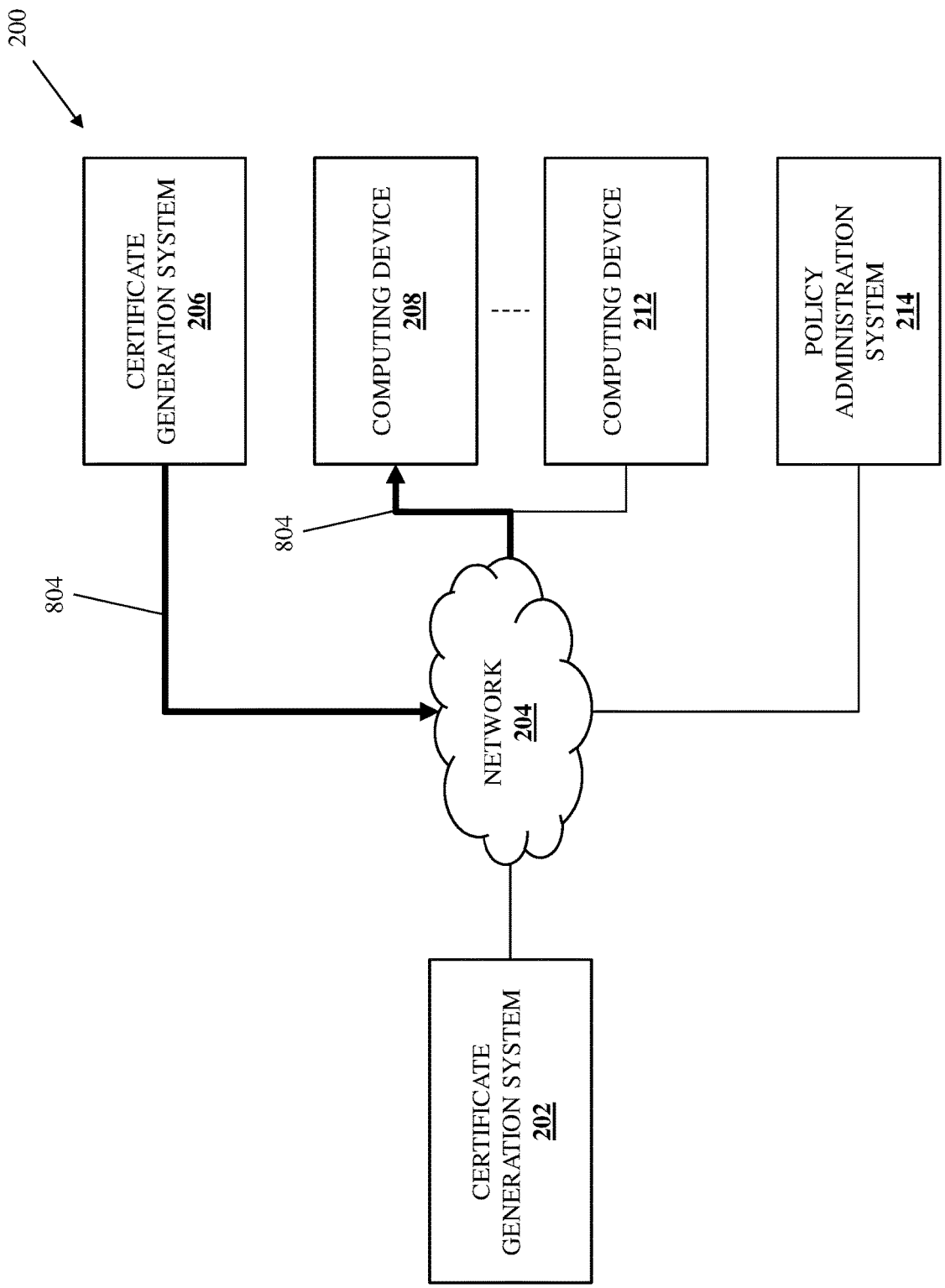
FIG. 8B is a schematic view illustrating an embodiment of the networked system of FIG. 2 operating during the method of FIG. 5.
Figure 8C:
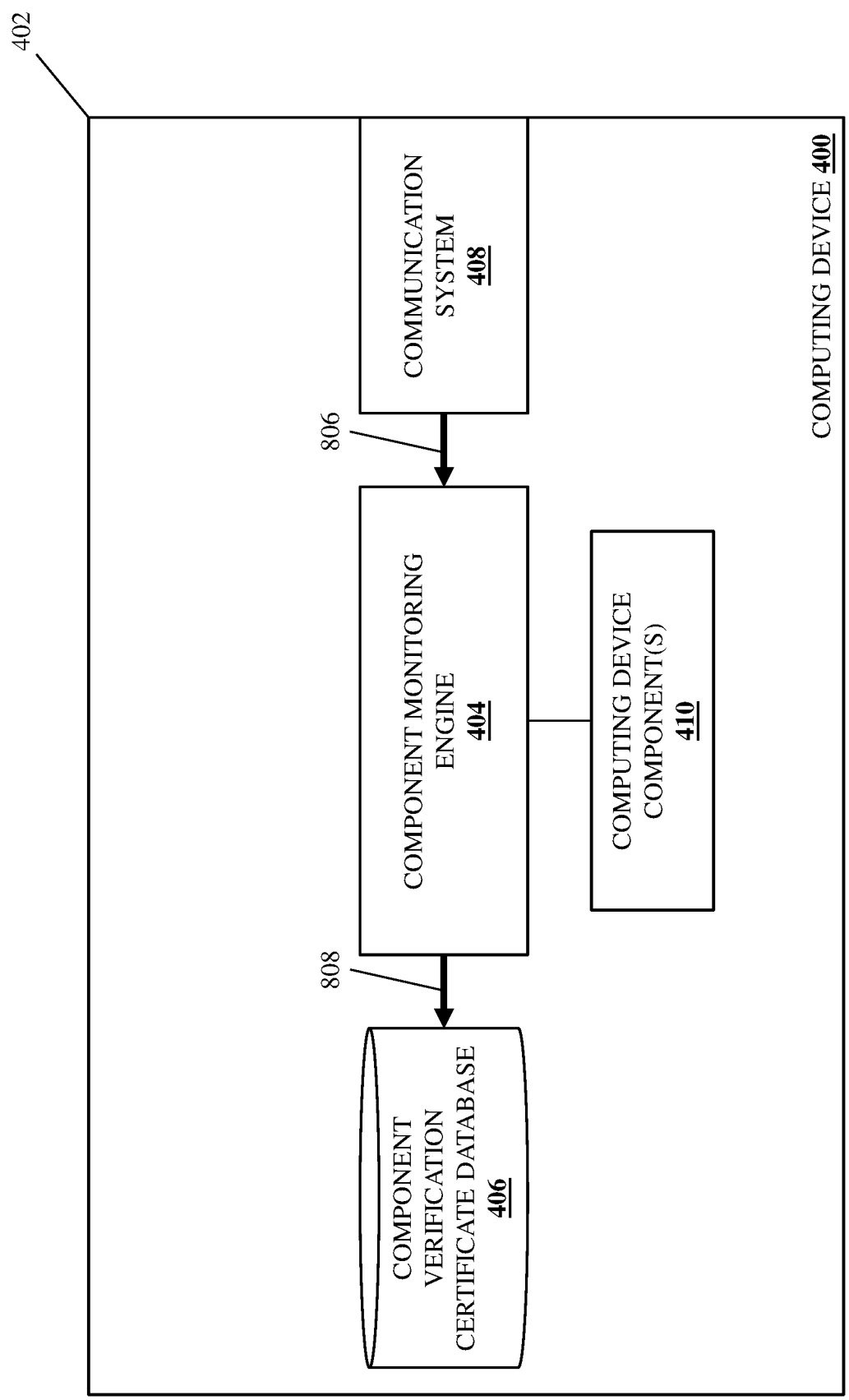
FIG. 8C is a schematic view illustrating an embodiment of the computing device of FIG. 4 operating during the method of FIG. 5.

In an embodiment, at block 508 and with reference to FIG. 8A, 8B, and 8C, the certificate generation system 206/300 in the networked system 200 is illustrated as generating an additional component verification certificate for computing device 208/400, which may have added or replaced one or more computing device components 410 since its initial manufacture. For example, as noted above, a computing device reseller or organization may use a certificate generation system to generate a component verification certificate to capture any component changes made to a computing device. In doing so, the certificate generation engine 304 may perform computing device analysis operations to analyze computing device 208/400 and identify a current inventory of computing device components 410 therein. The certificate generation engine 304 may then identify which computing device components 410 have been newly added to computing device 208/400. The certificate generation engine 304 may then perform certificate generation operations to generate a component verification certificate including component identification information, as well as component lifetime parameters for the computing device components 410 identified as being newly added, with those component lifetime parameters being generated using techniques similar to those discussed above. Alternatively, the certificate generation system 206 may generate a component verification certificate that includes component identification information for all computing device components 410 (including those that have been newly added) and corresponding component lifetimes, in which case the certificate generation engine 304 may not need to specifically identify which computing device components 410 are newly added.

As another alternative, the certificate generation engine 304 may operate to generate an additional component verification certificate by modifying an existing component verification certificate (e.g., an initial component verification certificate generated by a computing device manufacturer). In such cases, the certificate generation engine 304 may operate to receive the existing component verification certificate from network 204 via the communication system 308. The certificate generation engine 304, for example, may transmit a request to the computing device 208/400 over network 204 via communication system 308 requesting the existing component verification certificate, and may receive the existing component verification certificate from the computing device 208/400 over network 204 via communication system 308 in response. The certificate generation engine 304 may then modify the existing component verification certificate to include component identification information and component lifetime parameters for the computing device components 410 that were identified as being newly added.

In generating the additional component verification certificate, the certificate generation engine 304 may perform component lifetime retrieval operations 802 to retrieve component lifetime parameters from the component lifetime database 306 based, for example, on the component identification information for the components (e.g., the manufacturer and model). However, while illustrated as being retrieved from component lifetime database 306 in FIG. 8A, one of skill in the art in possession of the present disclosure will recognize that the parameters may be retrieved from any component in the computing device 300 that may store such information. In some embodiments, the certificate generation engine 304 may request and receive the component lifetime parameters from the policy administration system 214 or a component manufacturer system (not illustrated). For example, the certificate generation engine 304 may invoke an outward facing service (e.g., via the communication system 308 and over the network 204) provided by the policy administration system 214 or a component manufacturer system (not illustrated) that returns this information.

Once the additional component verification certificate has been generated, the certificate generation engine 304 may perform certificate transmission operations 804 to transmit the component verification certificate via the communication system 308, over the network 204, to computing device 208/400 (as illustrated in FIGS. 8A and 8B). The component monitoring engine 404 of the computing device 208/400 may then perform certificate receipt operations 806 to receive the component verification certificate from the network 204 via its communication system 408 (as illustrated in 8C). As will be appreciated by one of skill in the art in possession of the present disclosure, the transmission and receipt of the component verification certificate between the certificate generation system 206 and computing device 208/400 may take place automatically. For example, upon generation of the component verification certificate, the certificate generation system 206 may automatically invoke an outward facing service provided by the computing device 208/400 configured to receive the component verification certificate. One of skill in the art in possession of the present disclosure will recognize that the exchange of the component verification certificate between the certificate generation system 206 and computing device 208/400 may involve additional steps beyond those discussed such as, for example, requiring system authentication and/or performance of other security measures. One of skill in the art in possession of the present disclosure will also recognize that any of a number of other techniques for exchanging the component verification certificate between the certificate generation system 206 and computing device 208/400 may be suitably employed.

In addition to capturing changes to the components provided within a computing device, it may be desirable to modify the component lifetimes of computing device components. For example, an organization may wish to modify the default lifetime provided by a computing device manufacturer to better align with the IT policies of the organization. To provide a specific example, the component lifetime for a particular component provided in an initial component verification certificate or delta component verification certificate may reflect a mean time to failure of that component as determined by the component manufacturer, but an organization may believe the component to be critical (e.g., failure of a storage device may result in lost and unrecoverable data) and may wish to enforce a more conservative component lifetime for that component. In such cases, a certificate generation system may operate to generate an additional component verification certificate with modified component lifetime parameters for certain computing device components. The certificate generation system, for instance, may generate a component verification certificate including an inventory of only those components with modified component lifetimes (i.e., a "delta" component verification certificates) along with new component lifetimes those components. Alternatively, the certificate generation system may modify an existing component verification certificate (e.g., an initial component verification certificate generated by a computing device manufacturer or previously generated delta component verification certificate) by changing or augmenting the existing component lifetime parameters contained therein.

In such cases, the method 500 may additionally, or alternatively (e.g., in lieu of blocks 506-508), involve receiving a request at a certificate generation system to change the component lifetimes for one or more components of a computing device, generating an additional component verification certificate in response to the request that captures the requested changes, and transmitting the additional component verification certificate to and receiving it at the computing device.

As a specific example, in an embodiment, the certificate generation engine 304 of certificate generation system 206 may receive a request to change the component lifetimes for one or more computing device components 410 of computing device 208/400. The change request may be initiated by the certificate generation system 206 itself, or by computing device 208/300 or policy administration system 214 over network 204, and may identify specific computing device components 410 whose component lifetimes are to be changed. The certificate generation engine 304 may then perform certificate generation operations to generate a component verification certificate that includes component identification information and new component lifetime parameters for the computing device components 410 identified in the request.

In some examples, the change request may include the desired component lifetime parameters for the identified components, which the certificate generation engine 304 may utilize in generating the component verification certificate. In other examples, the certificate generation engine 304 may perform component lifetime retrieval operations to retrieve component lifetime parameters from component lifetime database 306 (or any component in computing device 300 that may store such information) based on, for example, the component identification information for the components (e.g., the manufacturer and model). Alternatively, the certificate generation engine 304 may request and receive the component lifetime parameters from the policy administration system 214 by invoking, for example, an outward facing service provided by the policy administration system 214 that returns this information (via the communication system 308 and over network 204).

In some instances, the change request received by the certificate generation engine 304 may seek to update the component lifetimes for the computing device components 410 generally, and may not identify specific computing device components 410 for modification. In such cases, the certificate generation engine 304 may perform computing device analysis operations to analyze computing device 208/400 and identify a current inventory of computing device components 410 therein. The certificate generation engine 304 may then perform certificate generation operations to generate a component verification certificate that includes component identification information as well as component lifetime parameters for all of the computing device components 410 identified. In doing so, the certificate generation engine 304 may perform component lifetime retrieval operations to retrieve component lifetime parameters from component lifetime database 306, or may request and receive the component lifetime parameters from the policy administration system 214, similar to that discussed above. Alternatively, the certificate generation engine 304 may generate an additional component verification certificate that includes component identification information and component lifetime parameters only for those components for which a modified component lifetime may exist (i.e., a delta component verification certificate), for example, in component lifetime database 306 or as returned by policy administration system 214.

As noted above, in alternative embodiments, the certificate generation engine 304 may operate to generate an additional component verification certificate by modifying an existing component verification certificate (e.g., an initial component verification certificate generated by a computing device manufacturer). In such cases, the certificate generation engine 304 may operate to receive the existing component verification certificate from network 204 via the communication system 308. The computing device 208/400, for example, may transmit the existing component verification certificate to the certificate generation system 206 as part of a change request. Alternatively, where the change request was initiated by another entity (e.g., the certificate generation system 206 itself, or policy administration system 214), the certificate generation engine 304 may transmit a request to the computing device 208/400 over network 204 via communication system 308 requesting the existing component verification certificate, and may receive the existing component verification certificate from the computing device 208/400 over network 204 via communication system 308 in response.

The certificate generation engine 304 may then selectively modify the existing component verification certificate based on the request. For example, if the update request identifies specific computing device components 410 whose component lifetimes are to be modified and/or provides modified component lifetime parameters, the certificate generation engine 304 may selectively modify those specific components and/or component lifetime parameters. Alternatively, if no specific computing device components 410 are identified in the request, the certificate generation engine 304 may examine each component in the existing component verification certificate and modify those components for which a modified component lifetime may exist (e.g., in component lifetime database 306, or returned by policy administration system 214).

Similar to the discussion of block 508 above, once the additional component verification certificate has been generated, the certificate generation engine 304 may perform certificate transmission operations to transmit the component verification certificate via the communication system 308 over the network 204 to computing device 208/400. The component monitoring engine 404 of the computing device 208/400, in turn, may perform certificate receipt operations to receive the additional component verification certificate with updated component lifetimes over the network 204 via its communication system 408.

While the foregoing discussion separately describes the generation of an additional component verification certificate that captures changes to the components of a computing device and the generation of an additional component verification certificate that changes or updates component lifetimes for one or more components of a computing device, one of skill in possession of the present disclosure will appreciate that an additional component verification certificate may be generated that both captures changes to the components of a computing device and changes or updates component lifetimes. Furthermore, while the foregoing discussion makes specific reference to the operation of the certificate generation system 206, one of skill in the art in possession of the present disclosure will recognize that other certificate generation systems may be employed in a similar manner. In alternative embodiments, for example, the certificate generation system 202, which may have been used to generate the initial component verification certificate, may also be used to generate the additional component verification certificate.

Once the additional component verification certificate has been generated, the method 500 proceeds to block 510 where the computing device stores the additional component verification certificate. In an embodiment, at block 510 and with reference to FIG. 8C, the component monitoring engine 404 of the computing device 208/400 performs certificate storage operations 808 to store the component verification certificate in the component verification certificate database 406. As noted above, the component verification certificate database 406 may reside in a secure storage device such that the component verification certificate database 406 is tamper-resistant. In such cases, the certificate storage operations 808 may involve one or more cryptographic operations. Furthermore, while illustrated as being stored in component verification certificate database 406 in FIG. 8C, one of skill in the art in possession of the present disclosure will recognize that the component verification certificate may be stored in any component in the computing device 400 capable of storing such information in a form suitable for that component.

While the foregoing describes the generation, transmission, receipt, and storage of an additional component verification certificate, this portion of method 500 (e.g., blocks 506-510) may be repeated throughout the lifetime of the computing device, such that multiple additional component verification certificates may be generated, transmitted, received, and stored as components are modified or added to the computing device.

The method 500 then proceeds to block 512 where a determination is made by the computing device whether a component lifetime has been exceeded. The computing device, for example, may retrieve and decode any stored component verification certificates (e.g., an initial component verification certificate and additional component verification certificate(s)) to obtain the component lifetime parameters contained therein. The computing device may then determine an applicable component lifetime for each component in the computing device and compare this against a current lifetime of the respective component to see whether the applicable component lifetime has been exceeded.

Figure 9:
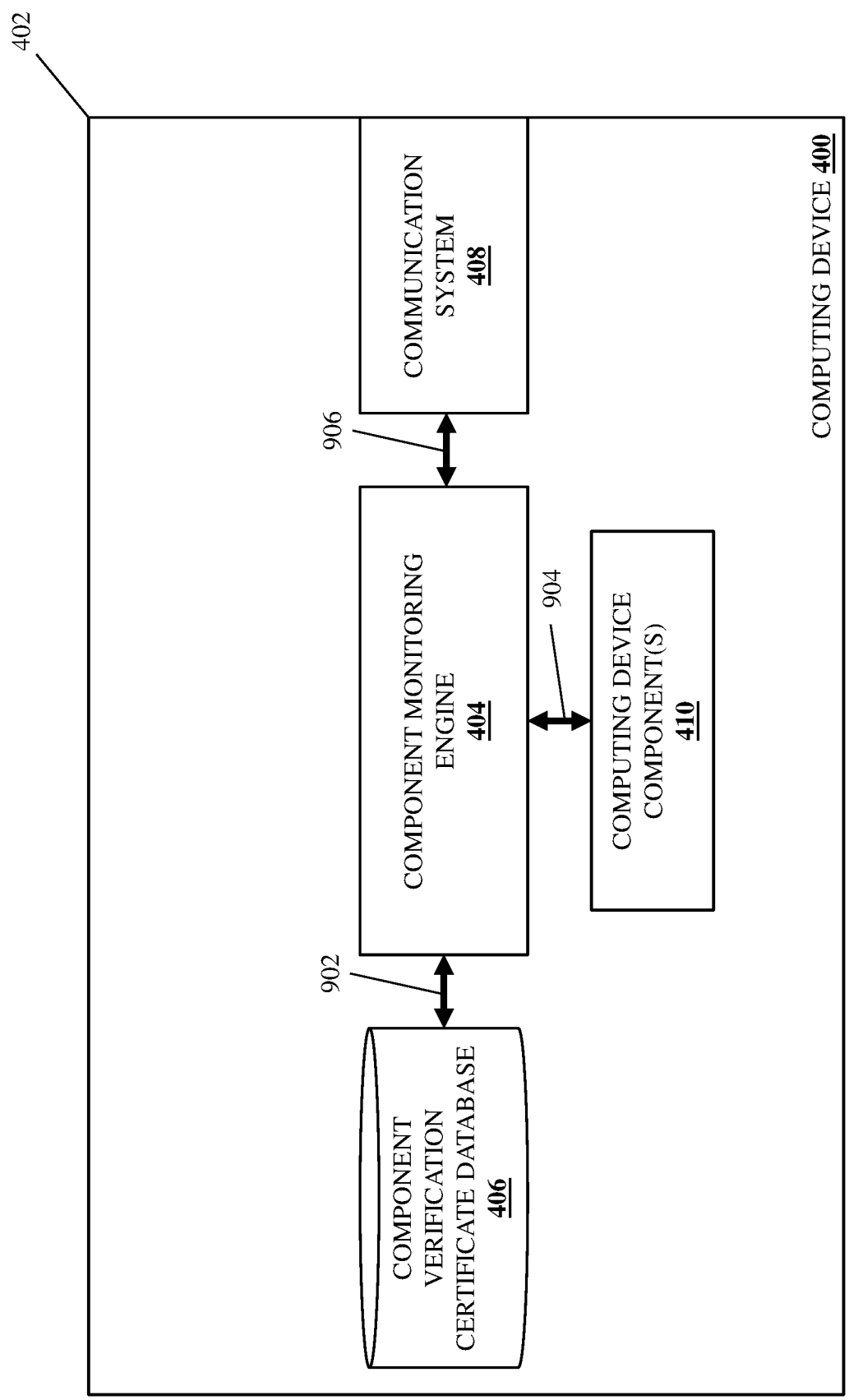
FIG. 9 is a schematic view illustrating an embodiment of the computing device of FIG. 4 operating during the method of FIG. 5.

In an embodiment, at block 506 and with reference to FIG. 9, the component monitoring engine 404 of computing device 208/400 may perform certificate retrieval operations 902 to retrieve any component verification certificates stored in component verification database 406 (or from any other component of the computing device 208/400 in which the component verification certificates may be stored). As noted above, the component verification certificate database 406 may reside in a secure storage device such that the component verification certificate database 406 is tamper-resistant. In such cases, the certificate retrieval operations 902 may involve one or more cryptographic operations, for example, to extract and validate the component verification certificates. The component monitoring engine 404 may then perform certificate decoding operations to decode the component verification certificates and obtain an inventory of computing device components and corresponding component lifetime parameters.

The component monitoring engine 404, for instance, may retrieve the initial component verification certificate and additional component verification certificates that were previously stored in the component verification certificate database 406, as discussed above. Once decoded, the initial component verification certificate may provide component lifetime parameters for the computing device components that were provided in the computing device when it was first manufactured, and the additional component verification certificate may provide component lifetime parameters for any computing device components that were added post manufacture and/or modified component lifetime parameters for one or more of the initial or later added computing device components.

The component monitoring engine 404 may then process the decoded component lifetime parameters to determine the applicable component lifetime parameters for each computing device component in the decoded inventory. For instance, as discussed above, the component verification certificate may provide both a default component lifetime (e.g., the duration of the manufacturer warranty, a mean time to failure of the component, etc.) as well as a recommended lifetime (e.g., specified by the IT department of an organization). In such cases, the component monitoring engine 404 may determine the recommended component lifetime parameters to be the applicable component lifetime parameters (i.e., with those recommended component lifetime parameters "overriding" the default component lifetime). In addition, in embodiments where the additional component verification certificate further provides a modified component lifetime for the same component, the component monitoring engine 404 may determine the modified component lifetime parameters to be the applicable lifetime parameters. Furthermore, to the extent that there may be multiple modified component lifetimes, for example, where there are multiple additional component verification certificates, the component monitoring engine 404 may identify the most recent modified component lifetime parameters (e.g., based on the creation date of the component verification certificates) to be the applicable component lifetime parameters.

The component monitoring engine 404 may then perform component lifetime assessment operations to determine whether any computing device component 410 of the computing device 208/400 has exceeded the applicable component lifetime parameters for that component. In doing so, the component monitoring engine 404 may perform current lifetime operations 904 to determine a current lifetime of a computing device component 410. By way of example, the applicable component lifetime parameters for a power supply unit may be two years from an original date of purchase (e.g., two years from Jan. 1, 2020), from a first date of use, from a first date of "regular" use (e.g., a date after which a minimum use of 4 days/week began), etc. The component monitoring engine 404 may compare this against a current date (e.g., Apr. 1, 2022) and determine that the power supply unit has exceeded the applicable component lifetime. As another example, the applicable component lifetime parameter for a storage device may be a particular number of write cycles (e.g., 3,000 program/erase cycles). The component monitoring engine 404 poll the storage device to determine its current lifetime (e.g., 3,100 program/erase cycles) and then determine that the storage device has exceeded the applicable component lifetime. The foregoing process for determining whether a component has exceeded a component lifetime may be performed by the computing device 208/400 periodically (e.g., hourly, daily, weekly, or some other set interval) and/or in conjunction with other operations of the computing device 208/400 (e.g., upon startup of the computing device 208/400, or upon receipt of a new component verification certificate).

If it is determined that a component lifetime has been exceeded, the method 500 proceeds to block 514 where the computing device identifies a component alert policy for the component having exceeded its component lifetime. An organization, for example, may have a policy to immediately generate an alert in response to a component having exceeded its component lifetime (e.g., for critical components, components having component lifetimes associated with component failure, etc.) and/or may have a policy to delay generation of an alert in response to a component having exceeded its component lifetime (e.g., for less critical components, components known to regularly exceed their component lifetimes, etc.). In the latter case, a component alert policy may specify a delay lifetime after which an alert is to be generated. The component alert policy for a storage device, for example, may specify a delay lifetime of a particular number of additional write cycles (e.g., 1,000 program/erase cycles) or an additional portion of the applicable lifetime that was exceeded (e.g., an additional 25% of the applicable component lifetime), which may be measured relative to the applicable component lifetime that had been exceeded and/or a current lifetime of the component.

Figure 10:
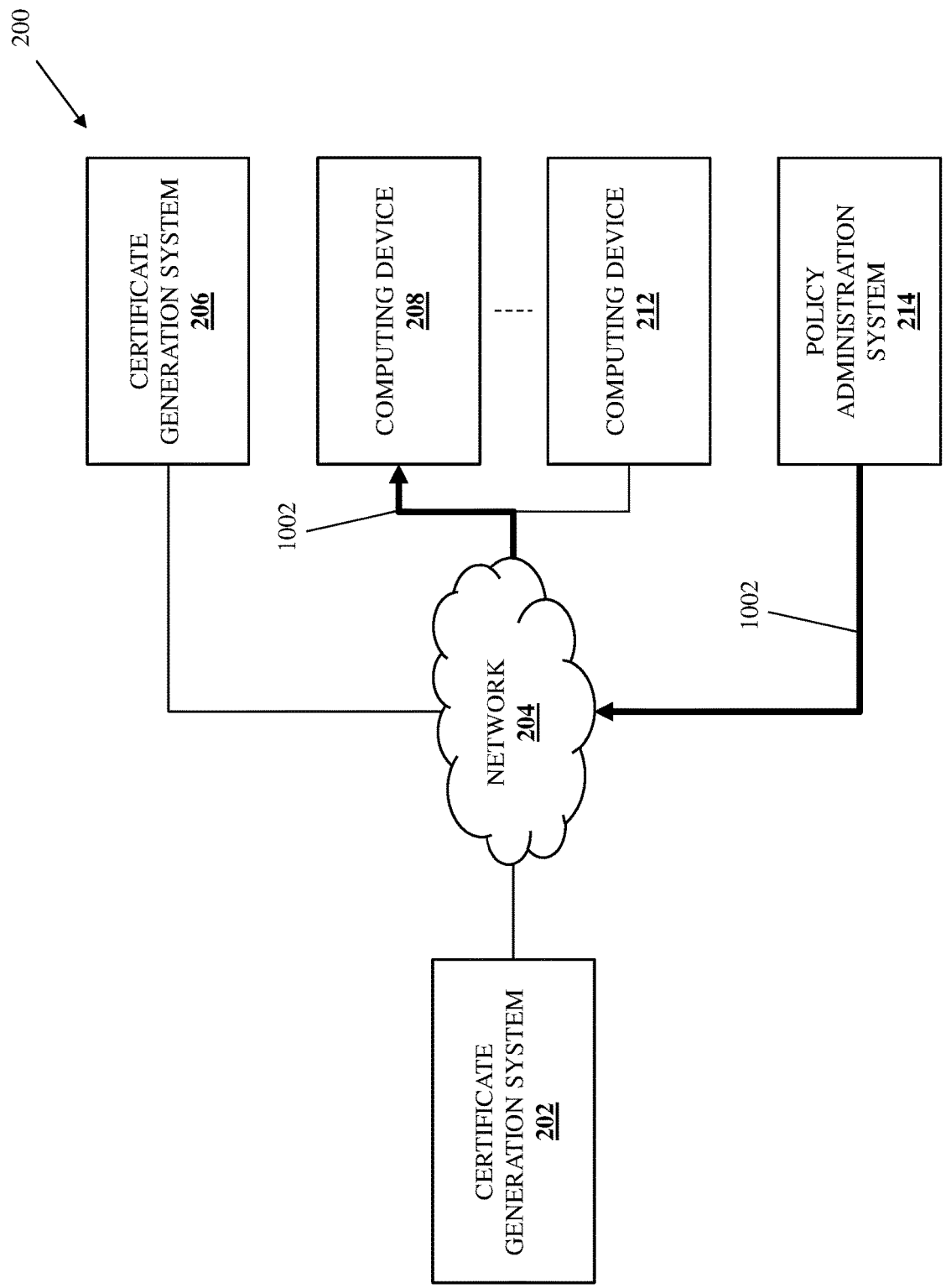
FIG. 10 is a schematic view illustrating an embodiment of the networked system of FIG. 2 operating during the method of FIG. 5.

With reference to FIGS. 9 and 10, in an embodiment of block 506 and upon determining that an applicable component lifetime for a computing device component 410 has been reached or exceeded, the component monitoring engine 404 of computing device 208/400 may perform alert policy identification operations 906 to identify a corresponding component alert policy. The component monitoring engine 404, for example, may transmit a component alert policy request to the policy administration system 214 over network 204 via communication system 408, which may invoke an outward facing service provided by the policy administration system 214 that returns the alert policy. With reference to FIG. 10, for example, the policy administration system 214 may perform component alert policy transmission operations 1002, to transmit the requested alert policy to the computing device 208/400 over network 204. The component monitoring engine 404, in turn, may receive the alert policy from the network 204 (via communication system 408).

While the foregoing discussion describes a particular process for requesting and receiving an alert policy from the policy administration system 214, one of skill in possession of the present disclosure will recognize that the component alert policy may be retrieved in a variety of manners and/or from a number of different locations. In some embodiments, for example, the computing device may request and receive the alert policy from a certificate generation system (e.g., certificate generation system 202 or certificate generation system 206) in a similar manner to that described above for the policy administration system 214. In other embodiments, the component alert policy may be included as component lifetime parameters within the component verification certificate itself.

The method 500 then proceeds to block 516 where the computing device generates one or more alerts for the computing device components that exceeded their applicable lifetimes based on the respective component alert policies identified for those components. The component alert policy, for example, may direct the computing device to generate an alert notifying the policy administration system that the computing device component 410 has exceeded its lifetime and that action should be taken, which the computing device may then transmit to the policy administration system. The policy administration system may automatically take action in response, and in some cases, direct the computing device to take responsive action. Alternatively, the component alert policy may instruct the computing device to generate an alert directing the policy administration system to take responsive action, and in some cases may be accompanied by the computing device taking a responsive action as well. Furthermore, as noted above, the component alert policy may specify a delay lifetime that must pass before the alert is generated.

In an embodiment, at block 516 and with reference to FIG. 9, the component monitoring engine 404 may perform alert generation operations to generate an alert in accordance with the component alert policy that was identified. For example, as discussed above, the component monitoring engine 404 may generate an alert notifying the policy administration system 214 that the computing device component 410 has exceeded its lifetime and that action should be taken. The component monitoring engine 404, for example, may generate an alert notifying the policy administration system that the power supply unit and/or storage devices have exceeded their applicable component lifetimes. With reference to FIG. 11, the component monitoring engine 404 may then perform alert transmission operations 1102 to transmit the alert to the policy administration system 204 over network 204 via communication system 408.

In some cases, the policy administration system 214 may automatically take action in response by, for example, sending a communication (e.g., an e-mail, instant message, or the like) to a system administrator notifying the system administrator of the same and/or suggesting that the components be replaced. The policy administration system 214 may also transmit a response to the computing device 208/400 over network 204 directing the computing device 208/400 to take certain remedial actions. For example, in response to receiving an alert that a storage device has exceeded an applicable component lifetime, the policy administration system 214 may direct the computing device 208/400 to initiate a backup of the storage device and/or take the storage device offline. Furthermore, in some embodiments the computing device may automatically initiate a backup of the storage device and/or take the storage device offline along with sending the alert to the policy administration system 214. The computing monitoring engine 404 may operate to receive the response and perform the directives provided therein.

In other cases, the alert generated by the component monitoring engine 404 may direct the policy administration 214 to automatically take action. For example, based on the component alert policy, the computing device 208/400 may generate an alert directing the policy administration system to schedule maintenance for the computing device and/or automatically order a replacement component from a vendor. The policy administration system 214 may operate to receive the response and perform the directives provided therein.

Furthermore, to the extent that a component alert policy may specify a delay lifetime, the component monitoring engine 404 may wait until the delay lifetime has been exceeded before generating and transmitting an alert. For example, where the component alert policy calls to delay the alert by a specific period of time, the component monitoring engine 404 may operate to initiate a timer for the specified time period and may generate the alert after the timer has expired. As another example, where the delay lifetime calls to delay generate of the alert based on an amount of additional usage, the component monitoring engine 404 may operate to periodically poll the computing device component (e.g., hourly, daily, weekly, etc.) until the usage limit has been exceeded (e.g., the component lifetime plus the delay time identified in the policy), after which the alert may be generated.

Thus, systems and methods have been described that provide for monitoring of computing devices to determine when their constituent components have exceeded a component lifetime. The computing devices may receive component verification certificates from the certificate generation systems that identify component lifetimes for one or more components in the respective computing devices, and store them in a database. The component verification certificates can then be used by the computing devices to determine whether their respective components have exceeded their component lifetimes. If a component lifetime has been exceeded for a particular component, the computing device can identify a corresponding component alert policy for the component and generate an alert based on the component alert policy.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A computing device component monitoring system, comprising:
   at least one certificate generation system; and
   a computing device that includes a plurality of components and that is coupled to the at least one certificate generation system via a network, wherein the computing device is configured to:
      receive, from the at least one certificate generation system, a component inventory verification certificate that is configured for use in verifying a component inventory of the computing device that is provided by the plurality of components, and that identifies a first component lifetime after which a first component that is included in the plurality of components should be replaced;
      store, in a database that is accessible to the computing device, the component inventory verification certificate;
      verify, using the component inventory verification certificate, the component inventory of the computing device that is provided by the plurality of components;
      determine that the first component lifetime identified in the component inventory verification certificate has not been exceeded;
      receive, from the at least one certificate generation system, a modified component inventory verification certificate that is configured for use in verifying the component inventory of the computing device that is provided by the plurality of components, and that identifies a modified first component lifetime after which the first component in the computing device should be replaced;
      store, in a database that is accessible to the computing device, the modified component inventory verification certificate;
      verify, using the modified component inventory verification certificate, the component inventory of the computing device that is provided by the plurality of components;
      replace, in response to receiving the modified component inventory verification certificate, the first component lifetime with the modified first component lifetime;
      determine that the modified first component lifetime identified in the modified component inventory verification certificate has been exceeded;
      identify, in response to determining that the modified first component lifetime identified in the modified component inventory verification certificate has been exceeded, a first component alert policy;
      generate, based on the first component alert policy, a first component alert; and
      generate, based on the first component alert policy, a first component replacement order that automatically orders a replacement for the first component.

2. The system of claim 1, wherein the component inventory verification certificate and the modified component inventory verification certificate are configured for use in verifying the component inventory that was provided in the computing device during manufacture of the computing device.

3. The system of claim 1, wherein the first component was provided in the computing device during manufacture of the computing device, and wherein the computing device is configured to:
   receive, subsequent to the manufacture of the computing device, a second component;
   receive, from the at least one certificate generation system, an updated component inventory verification certificate that is configured for use in verifying an updated component inventory of the computing device that includes the second component, and that identifies a second component lifetime after which the second component in the computing device should be replaced;
   store, in the database that is accessible to the computing device, the updated component inventory verification certificate;
   verify, using the updated component inventory verification certificate, the updated component inventory of the computing device that includes the second component;
   determine that the second component lifetime identified in the updated component inventory verification certificate has been exceeded;
   identify, in response to determining that the second component lifetime identified in the updated component inventory verification certificate has been exceeded, a second component alert policy; and
   generate, based on the second component alert policy, a second component alert.

4. The system of claim 1, wherein the first component alert is generated after an alert delay lifetime that is immediately subsequent to the modified first component lifetime having been exceeded and that is defined by the first component alert policy.

5. The system of claim 1, wherein the modified first component lifetime is shorter than the first component lifetime.

6. An Information Handling System (IHS), comprising:
   a processing system; and
   a memory system that is coupled to the processing system and that includes instructions that, when executed by the processing system, cause the processing system to provide a component monitoring engine that is configured to:
      receive, from at least one certificate generation system, an IHS component inventory verification certificate that is configured for use in verifying a component inventory of the IHS that is provided by a plurality of components in the IHS, and that identifies a first component lifetime after which a first component that is included in the plurality of components should be replaced;
      store, in a database that is accessible to the processing system, the IHS component inventory verification certificate;
      verify, using the IHS component inventory verification certificate, the component inventory of the IHS that is provided by the plurality of components;

determine that the first component lifetime identified in the IHS component inventory verification certificate has not been exceeded;

receive, from the at least one certificate generation system, a modified IHS component inventory verification certificate that is configured for use in verifying the component inventory of the IHS that is provided by the plurality of components, and that identifies a modified first component lifetime after which the first component in the computing device should be replaced;

store, in a database that is accessible to the processing system, the modified IHS component inventory verification certificate;

verify, using the modified IHS component inventory verification certificate, the component inventory of the IHS that is provided by the plurality of components;

replace, in response to receiving the modified IHS component inventory verification certificate, the first component lifetime with the modified first component lifetime;

determine that the modified first component lifetime identified in the modified IHS component inventory verification certificate has been exceeded;

identify, in response to determining that the modified first component lifetime identified in the modified IHS component inventory verification certificate has been exceeded, a first component alert policy;

generate, based on the first component alert policy, a first component alert; and generate, based on the first component alert policy, a first component replacement order that automatically orders a replacement for the first component.

7. The IHS of claim 6, wherein the IHS component inventory verification certificate and the modified IHS component inventory verification certificate are configured for use in verifying the component inventory that was provided in the IHS during manufacture of the IHS.

8. The IHS of claim 6, wherein the first component was provided in the IHS during manufacture of the IHS, and wherein the component monitoring engine is configured to:
receive, subsequent to the manufacture of the IHS, a second component;
receive, from the at least one certificate generation system, an updated IHS component inventory verification certificate that is configured for use in verifying an updated component inventory of the IHS that includes the second component, and that identifies a second component lifetime after which the second component in the IHS should be replaced;
store, in the database that is accessible to the processing system, the updated IHS component inventory verification certificate;
verify, using the updated IHS component inventory verification certificate, the updated component inventory of the IHS that includes the second component;
determine that the second component lifetime identified in the updated IHS component inventory verification certificate has been exceeded;
identify, in response to determining that the second component lifetime identified in the updated IHS component inventory verification certificate has been exceeded, a second component alert policy; and
generate, based on the second component alert policy, a second component alert.

9. The IHS of claim 6, wherein the first component alert is generated after an alert delay lifetime that is immediately subsequent to the first modified component lifetime having been exceeded and that is defined by the first component alert policy.

10. The IHS of claim 6, wherein the modified first component lifetime is shorter than the first component lifetime.

11. The IHS of claim 6, wherein the first component alert automatically schedules a replacement of the first component in an immediately subsequent maintenance cycle.

12. A method for monitoring components of a computing device, comprising:
receiving, by a computing device from at least one certificate generation system, a component inventory verification certificate that is configured for use in verifying a component inventory of the computing device that is provided by a plurality of components in the computing device, and that identifies a first component lifetime after which a first component that is included in the plurality of components should be replaced;
storing, by the computing device in a database that is accessible to the computing device, the component inventory verification certificate;
verifying, by the computing device using the component inventory verification certificate, the component inventory of the computing device that is provided by the plurality of components;
determining, by the computing device, that the first component lifetime identified in the component inventory verification certificate has not been exceeded;
receiving, by the computing device from the at least one certificate generation system, a modified component inventory verification certificate that is configured for use in verifying the component inventory of the computing device that is provided by the plurality of components, and that identifies a modified first component lifetime after which the first component in the computing device should be replaced;
storing, by the computing device in a database that is accessible to the computing device, the modified component inventory verification certificate;
verifying, by the computing device using the modified component inventory verification certificate, the component inventory of the computing device that is provided by the plurality of components;
replacing, by the computing device in response to receiving the modified component inventory verification certificate, the first component lifetime with the modified first component lifetime;
determining, by the computing device, that the modified first component lifetime identified in the modified component inventory verification certificate has been exceeded;
identifying, by the computing device in response to determining that the modified first component lifetime identified in the modified component inventory verification certificate has been exceeded, a first component alert policy; and
generating, by the computing device based on the first component alert policy, a first component alert; and
generating, by the computing device based on the first component alert policy, a first component replacement order that automatically orders a replacement for the first component.

13. The method of claim 12, wherein the component inventory verification certificate and the modified component inventory verification certificate are configured for use in verifying that the component inventory was provided in the computing device during manufacture of the computing device.

14. The method of claim 12, wherein the first component was provided in the computing device during manufacture of the computing device, and wherein the method includes:
   receiving, by the computing device subsequent to the manufacture of the computing device, a second component;
   receiving, by the computing device from the at least one certificate generation system, an updated component inventory verification certificate that is configured for use in verifying an updated component inventory of the computing device that includes the second component, and that identifies a second component lifetime after which the second component in the computing device should be replaced;
   storing, by the computing device in the database that is accessible to the computing device, the updated component inventory verification certificate;
   verifying, by the computing device using the updated component inventory verification certificate, the updated component inventory of the computing device that includes the second component;
   determining, by the computing device, that the second component lifetime identified in the updated component inventory verification certificate has been exceeded; and
   identifying, by the computing device in response to determining that the second component lifetime identified in the updated component inventory verification certificate has been exceeded, a second component alert policy; and
   generating, by the computing device based on the second component alert policy, a second component alert.

15. The method of claim 12, wherein the first component alert is generated after an alert delay lifetime that is immediately subsequent to the modified first component lifetime having been exceeded and that is defined by the first component alert policy.

16. The method of claim 12, wherein the modified first component lifetime is shorter than the first component lifetime.

17. The method of claim 12, wherein the first component alert automatically schedules a replacement of the first component in an immediately subsequent maintenance cycle.

* * * * *